United States Patent
Sugawara et al.

(10) Patent No.: US 8,771,892 B2
(45) Date of Patent: Jul. 8, 2014

(54) FUEL CELL POWER GENERATION SYSTEM AND OPERATION STOP METHOD OF THE SAME

(75) Inventors: Yasushi Sugawara, Osaka (JP); Eiichi Yasumoto, Kyoto (JP); Takahiro Umeda, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/361,482

(22) Filed: Jan. 30, 2012

(65) Prior Publication Data

US 2012/0189931 A1 Jul. 26, 2012

Related U.S. Application Data

(63) Continuation of application No. PCT/JP2011/001622, filed on Mar. 18, 2011.

(30) Foreign Application Priority Data

Mar. 18, 2010 (JP) ................................. 2010-062633

(51) Int. Cl.
*H01M 8/04* (2006.01)
(52) U.S. Cl.
USPC ........................... 429/429; 429/428; 429/443
(58) Field of Classification Search
USPC ......................................... 429/429, 428, 443
See application file for complete search history.

(56) References Cited

U.S. PATENT DOCUMENTS

| | | | |
|---|---|---|---|
| 6,068,942 A | 5/2000 | Strasser et al. | |
| RE38,156 E | 6/2003 | Strasser et al. | |
| 2005/0271911 A1 | 12/2005 | Kuriki et al. | |
| 2006/0188765 A1 | 8/2006 | Matsuzaki et al. | |
| 2007/0212582 A1* | 9/2007 | Ohara et al. | ..................... 429/26 |
| 2008/0038599 A1 | 2/2008 | Ozeki et al. | |

FOREIGN PATENT DOCUMENTS

| | | |
|---|---|---|
| EP | 1 892 783 A1 | 2/2008 |
| JP | 03-081970 | 4/1991 |
| JP | 2003-306309 | 10/2003 |
| JP | 2005-026033 | 1/2005 |
| JP | 2005-194111 | 7/2005 |
| JP | 2005-259664 | 9/2005 |
| JP | 2007-141758 | 6/2007 |

(Continued)

OTHER PUBLICATIONS

Extended European Search Report issued in European Patent Application No. EP 11755938.5 dated Feb. 4, 2013.

(Continued)

*Primary Examiner* — Jane Rhee
(74) *Attorney, Agent, or Firm* — McDermott Will & Emery LLP

(57) ABSTRACT

A fuel cell power generation system including a fuel cell, a fuel generator, an oxidizing gas supply device, an output controller, an open-close mechanism, and a controller. The controller is configured such that in a stop process, the controller controls the output controller to stop supplying the electric power to an external load; controls the oxidizing gas supply device to stop supplying an oxidizing gas and controls the open-close mechanism to close a passage upstream from an oxidizing gas channel; after the passage upstream from the oxidizing gas channel is closed, stops a raw material gas supply device and a water supply device when a predetermined period has elapsed, during which period a gas in the oxidizing gas channel is replaced by a fuel gas.

6 Claims, 12 Drawing Sheets

(56) References Cited

FOREIGN PATENT DOCUMENTS

| | | |
|---|---|---|
| JP | 2007-179851 | 7/2007 |
| JP | 2008-300368 | 12/2008 |
| JP | 4248182 | 1/2009 |
| JP | 4283928 | 3/2009 |
| JP | 2009-170388 | 7/2009 |

OTHER PUBLICATIONS

International Search Report issued in International Patent Application No. PCT/JP2011/001622 dated Jun. 28, 2011.

* cited by examiner

FUEL CELL POWER GENERATION SYSTEM AND OPERATION STOP METHOD OF THE SAME

RELATED APPLICATIONS

This application is continuation of PCT International Application PCT/JP2011/001622, filed on Mar. 18, 2011, which claims priority to Japanese Application No. 2010-062633, filed on Mar. 18, 2010. The disclosures of these applications including the specifications, the drawings, and the claims are hereby incorporated by reference in their entirety.

TECHNICAL FIELD

The present disclosure relates to a fuel cell power generation system and an operation stop method of the fuel cell power generation system, and particularly to operation stop control of the fuel cell power generation system.

RELATED ART

Fuel cell power generation systems typified by household fuel cell co-generation systems include: a power generator using a fuel cell; and a hot water tank for storing water (hot water) heated up by heat that is generated when the power generator generates electric power. In general, such a fuel cell power generation system includes, as a source of hydrogen supply, a fuel generator configured to reform a raw material such as a hydrocarbon.

Such a fuel cell power generation system is required to have a high energy conversion efficiency and to be capable of maintaining the high energy conversion efficiency (i.e., durability). For example, assume a case where a household fuel cell power generation system uses, as a raw material gas, city gas (natural gas) or the like containing methane as a main component. In this case, a method of operating the system as described below is effective for providing advantages in terms of heating and lighting expenses and enhancing $CO_2$ emission reduction effect. In the method, the system is stopped during a period in which consumption of electricity and heat is small, and is operated during a period in which consumption of electricity and heat is great. Generally speaking, DSS (Daily Start-Up & Shut-Down) operation, in which the system is operated in the daytime and is stopped late at night, provides advantages in terms of heating and lighting expenses and enhances $CO_2$ emission reduction effect. Therefore, it is desired that fuel cell power generation systems are flexible enough to be suited for an operation pattern that includes such start-ups and stops.

However, in a case where a fuel cell power generation system performs DSS operation, when the system has stopped operating, a situation may occur where oxygen remains within the fuel cell or external air flows into the fuel cell, causing electrode catalyst degradation, resulting in a decrease in battery performance.

There is a known method of operating a polymer electrolyte membrane fuel cell power generator as a method that overcomes the above problem. In the method, after oxygen supply is stopped, hydrogen supply to the fuel cell is continued until an oxygen partial pressure in a cathode part becomes a predefined value, thereby causing residual oxygen in the cathode part to be consumed for generating electrical energy (see Patent Literature 1, for example). Also, there is a known fuel cell operation method in which fuel cell degradation is recovered. In the method, while a hydrogen-containing gas is supplied to an anode, supply of an oxygen-containing gas to a cathode is stopped and a current in the same direction as a current application direction in an electric power generating state is applied to cells by an external power supply configured to supply DC power, so that hydrogen is generated at the cathode which is not supplied with the hydrogen-containing gas, and thereby fuel cell degradation is recovered (see Patent Literature 2, for example).

There has been another conventional problem as follows: after the operation of a fuel cell power generation system is stopped, the internal temperature of the fuel cell decreases, causing a decrease in the internal pressure of the fuel cell, resulting in a possibility that air flows into the fuel cell. There is a known fuel cell power generation system that overcomes such a problem. The system includes: a branch pipe which branches off from a fuel supply pipe for supplying a hydrocarbon-based fuel to a reformer and through which the hydrocarbon-based fuel is supplied to the anode side of the fuel cell; and a control valve provided on the branch pipe (see Patent Literature 3, for example). In the fuel cell power generation system disclosed in Patent Literature 3, after a time period necessary for purging the fuel cell has elapsed, the control valve is closed to stop supplying the hydrocarbon-based fuel to the fuel cell. Then, when a predetermined period has elapsed after the supply of the hydrocarbon-based fuel is temporarily stopped, the control valve is opened to supply the fuel cell with the hydrocarbon-based fuel which is necessary to eliminate a negative pressure state in the fuel cell.

CITATION LIST

Patent Literature

PLT 1: Japanese Patent No. 3761583
PLT 2: Japanese Patent No. 4283928
PLT 3: Japanese Patent No. 4248182

SUMMARY OF DISCLOSURE

A fuel cell power generation system according to the present disclosure includes: a fuel cell including an electrolyte membrane, an anode, a cathode, a fuel gas channel through which a fuel gas is supplied to the anode, and an oxidizing gas channel through which an oxidizing gas is supplied to the cathode, the fuel cell being configured to generate electric power by causing a reaction between the fuel gas supplied to the anode and the oxidizing gas supplied to the cathode; a fuel generator configured to generate the fuel gas by causing a reforming reaction between a raw material gas supplied from a raw material gas supply device and water supplied from a water supply device, and to supply the fuel gas to the fuel gas channel of the fuel cell through a fuel gas supply passage; an oxidizing gas supply device configured to supply the oxidizing gas to the oxidizing gas channel of the fuel cell through an oxidizing gas supply passage; a fuel gas discharge passage through which the fuel gas that is unused and discharged from the fuel gas channel of the fuel cell flows; an oxidizing gas discharge passage through which the oxidizing gas that is unused and discharged from the oxidizing gas channel of the fuel cell flows; an output controller configured to extract electric power from the fuel cell and to supply the electric power to an external load; an open-close mechanism configured to open and close a passage upstream from the fuel gas channel, a passage downstream from the fuel gas channel, and a passage upstream from the oxidizing gas channel; and a controller. The controller is configured such that in a stop process, the controller: reduces an amount of the electric power extracted from the fuel cell and then controls the output controller to stop supplying the electric power to the external load; controls the oxidizing gas supply device to stop supplying the oxidizing gas and controls the open-close mechanism to close the passage upstream from the oxidizing gas channel; after the passage upstream from the oxidizing gas channel is closed, stops the raw material gas supply device and the water supply device when a predetermined period has elapsed, during which period the oxidizing gas in the oxidizing gas channel is consumed by the fuel gas that has cross-leaked to the oxidizing gas channel through the electrolyte membrane; and then controls the open-close mechanism to close the passage upstream from the fuel gas channel and the passage downstream from the fuel gas channel.

An operation method, according to the present disclosure, of a fuel cell power generation system including a fuel cell, the fuel cell including an electrolyte membrane, an anode, a cathode, a fuel gas channel through which a fuel gas is supplied to the anode, and an oxidizing gas channel through which an oxidizing gas is supplied to the cathode, the fuel cell being configured to generate electric power by causing a reaction between the fuel gas supplied to the anode and the oxidizing gas supplied to the cathode. The operation stop method includes: a step (A) in which an output controller reduces an amount of electric power extracted from the fuel cell and then stops supplying the electric power to an external load; a step (B) in which an oxidizing gas supply device stops supplying the oxidizing gas, and the open-close mechanism closes a passage upstream from the oxidizing gas channel; a step (C) in which after the passage upstream from the oxidizing gas channel is closed, a raw material gas supply device and a water supply device stop when a predetermined period has elapsed, during which period the oxidizing gas in the oxidizing gas channel is consumed by the fuel gas that has cross-leaked to the oxidizing gas channel through the electrolyte membrane; and a step (D) in which the open-close mechanism closes a passage upstream from the fuel gas channel and a passage downstream from the fuel gas channel after the step (C).

The above object, other objects, features, and advantages of the present disclosure will be made clear by the following detailed description of preferred embodiments with reference to the accompanying drawings.

The fuel cell power generation system and the operation method of the fuel cell power generation system according to the present disclosure realize lowered costs, reduced energy loss, and improved durability.

DESCRIPTION OF EMBODIMENTS

Figure 1:
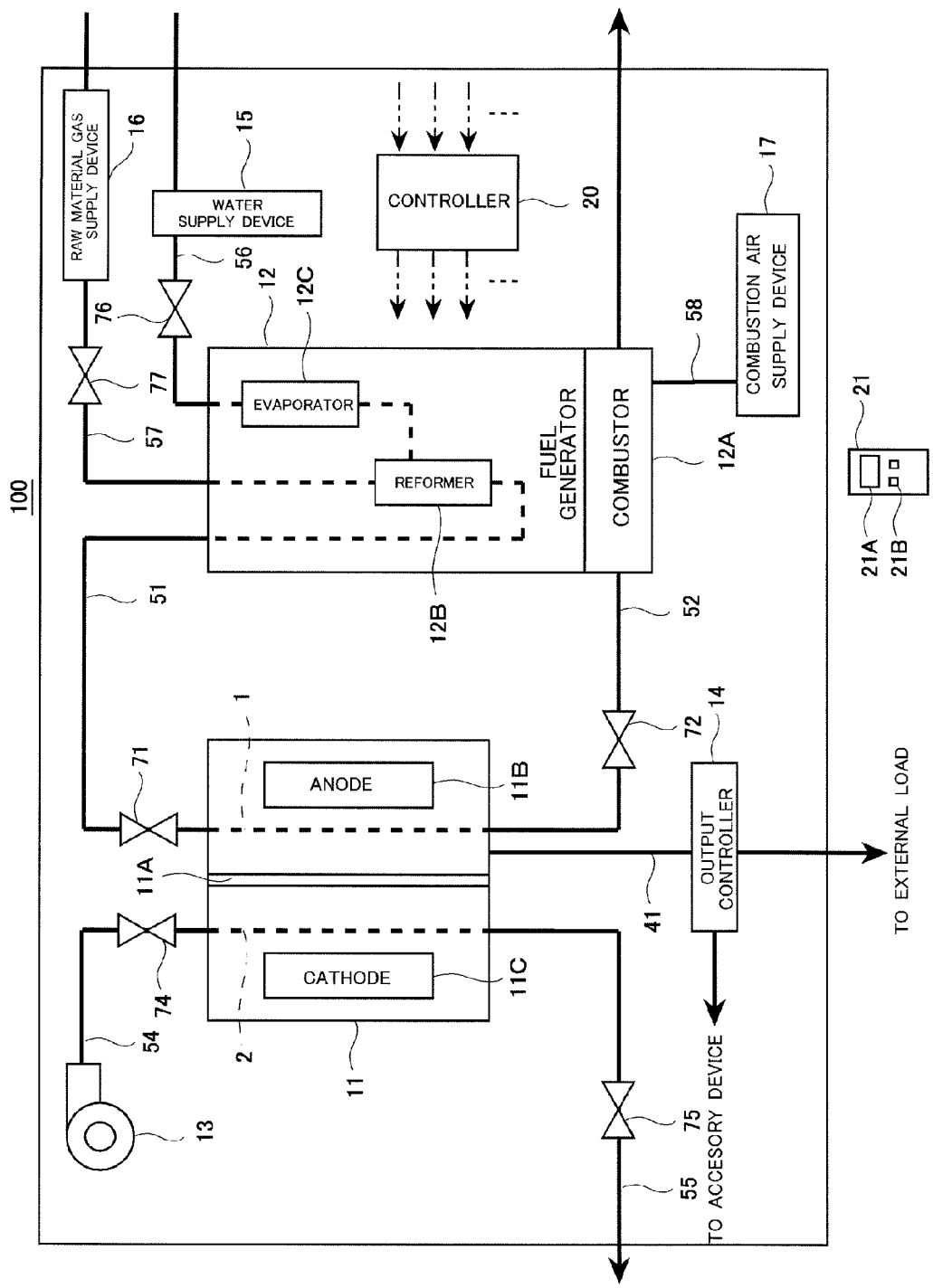
FIG. 1 is a schematic diagram showing a schematic configuration of a fuel cell power generation system according to Embodiment 1 of the present disclosure.

The inventors of the present invention have obtained findings as follows. Conventional fuel cell power generation systems fail to take into consideration the amount of electric power generated by a fuel cell when the operation of a fuel cell power generation system including the fuel cell is stopped. Accordingly, if a stop command to stop such a fuel cell power generation system is inputted to a controller, then a stop process is performed while the amount of electric power generated by the fuel cell is maintained to a level at the time of input of the stop command. As a result, while the stop process is being performed, a fuel gas is generated in an amount more than necessary. This results in unnecessary consumption of a raw material gas. The fuel gas thus generated is combusted by the combustor, and is simply discharged to the outside as heat. Therefore, the more the amount of generated fuel gas, the greater the energy loss. Particularly in the operation method of the polymer electrolyte membrane fuel cell power generator disclosed in Patent Literature 1, fuel gas supply continues until the concentration of residual oxygen becomes low. This causes greater energy loss. In view of these, the inventors of the present invention have found that adopting configurations as described below are significantly effective for achieving the aforementioned object of the present disclosure, and have arrived at the present invention.

Hereinafter, embodiments of the present disclosure will be described with reference to the drawings. In the drawings, the same or corresponding components are denoted by the same reference signs, and a repetition of the same description is avoided. In the drawings, only the components necessary for describing the present disclosure are shown, and the other components are omitted. Further, the present disclosure is not limited to the following embodiments.

Embodiment 1

A fuel cell power generation system according to Embodiment 1 of the present disclosure includes: a fuel cell including an electrolyte membrane, an anode, a cathode, a fuel gas channel through which a fuel gas is supplied to the anode, and an oxidizing gas channel through which an oxidizing gas is supplied to the cathode, the fuel cell being configured to generate electric power by causing a reaction between the fuel gas supplied to the anode and the oxidizing gas supplied to the cathode; a fuel generator configured to generate the fuel gas by causing a reforming reaction between a raw material gas supplied from a raw material gas supply device and water supplied from a water supply device, and to supply the fuel gas to the fuel gas channel of the fuel cell through a fuel gas supply passage; an oxidizing gas supply device configured to supply the oxidizing gas to the oxidizing gas channel of the fuel cell through an oxidizing gas supply passage; a fuel gas discharge passage through which the fuel gas that is unused and discharged from the fuel gas channel of the fuel cell flows; an oxidizing gas discharge passage through which the oxidizing gas that is unused and discharged from the oxidizing gas channel of the fuel cell flows; an output controller configured to extract electric power from the fuel cell and to supply the electric power to an external load; an open-close mechanism configured to open and close a passage upstream from the fuel gas channel, a passage downstream from the fuel gas channel, and a passage upstream from the oxidizing gas channel; and a controller. The fuel cell power generation system according to Embodiment 1 serves as an example where the controller is configured such that in a stop process, the controller: reduces an amount of the electric power extracted from the fuel cell and then controls the output controller to stop supplying the electric power to the external load; controls the oxidizing gas supply device to stop supplying the oxidizing gas and controls the open-close mechanism to close the passage upstream from the oxidizing gas channel; after the passage upstream from the oxidizing gas channel is closed, stops the raw material gas supply device and the water supply device when a predetermined period has elapsed, during which period the gas in the oxidizing gas channel is replaced by the fuel gas that has cross-leaked to the oxidizing gas channel through the electrolyte membrane; and then controls the open-close mechanism to close the passage upstream from the fuel gas channel and the passage downstream from the fuel gas channel.

[Configuration of Fuel Cell Power Generation System]

FIG. 1 is a schematic diagram showing a schematic configuration of the fuel cell power generation system according to Embodiment 1 of the present disclosure.

As shown in FIG. 1, a fuel cell power generation system 100 according to Embodiment 1 of the present disclosure includes: a fuel cell 11 including an electrolyte membrane 11A, a fuel gas channel 1, and an oxidizing gas channel 2; a fuel generator 12 including a combustor 12A; a fuel gas supply passage 51; a fuel gas discharge passage 52; a fuel gas supply open-close device 71; a fuel gas discharge open-close device 72; an oxidizing gas supply device 13; an oxidizing gas supply passage 54; an oxidizing gas supply open-close device 74; an oxidizing gas discharge passage 55; an oxidizing gas discharge open-close device 75; an output controller 14; a water supply device 15; a raw material gas supply device 16; and a controller 20. In Embodiment 1, the fuel gas supply open-close device 71, the fuel gas discharge open-close device 72, the oxidizing gas supply open-close device 74, and the oxidizing gas discharge open-close device 75 form an open-close mechanism.

In a stop process, the controller 20 reduces the amount of electric power extracted from the fuel cell 11 and then controls the output controller 14 to stop supplying the extracted electric power to an external load, and controls the oxidizing gas supply device 13 to stop supplying an oxidizing gas. Also, the controller 20 controls the open-close mechanism (the oxidizing gas supply open-close device 74) to close the oxidizing gas supply passage 54 (a passage upstream from the oxidizing gas channel 2), and after the oxidizing gas supply passage 54 is closed, stops the raw material gas supply device 16 and the water supply device 15 when a predetermined period has elapsed, during which period oxygen in the oxidizing gas channel 2 is consumed by a fuel gas that has cross-leaked to the oxidizing gas channel 2 through the electrolyte membrane 11A. Thereafter, the controller 20 controls the open-close mechanism (the fuel gas supply open-close device 71, the fuel gas discharge open-close device 72, and the oxidizing gas discharge open-close device 75) to close the fuel gas supply passage 51 (a passage upstream from the fuel gas channel 1), the fuel gas discharge passage 52 (a passage downstream from the fuel gas channel 1), and the oxidizing gas discharge passage 55.

The fuel cell 11 includes the electrolyte membrane 11A, an anode 11B, a cathode 11C, the fuel gas channel 1, and the oxidizing gas channel 2. For example, a polymer electrolyte membrane that selectively transports hydrogen ion (e.g., Nafion (product name) manufactured by DuPont, USA) may be used as the electrolyte membrane 11A. The fuel gas channel 1 is configured to supply a fuel gas to the anode 11B. The oxidizing gas channel 2 is configured to supply the oxidizing gas to the cathode 11C. At the anode 11B and the cathode 11C, the supplied fuel gas and oxidizing gas electrochemically react with each other. As a result, water is produced, and electric power and heat are generated. In the fuel cell 11, a cooling medium such as water or an antifreezing fluid (e.g., ethylene glycol-containing solution) flows through a cooling medium channel which is not shown. This allows the generated heat to be collected by the cooling medium. The cooling medium that has collected the heat exchanges the heat with water, and hot water resulting from the heat exchange is stored in a hot water tank (not shown). It should be noted that a conventional polymer electrolyte fuel cell can be used as the fuel cell 11 of the fuel cell power generation system 100 according to Embodiment 1. Therefore, detailed description of the configuration of the fuel cell 11 is omitted.

The fuel generator 12 includes a reformer 12B and an evaporator 12C. The water supply device 15 is connected to the evaporator 12C via a water supply passage 56. The water supply passage 56 is provided with a water open-close device 76. The water supply device 15 may be configured in any form, so long as the water supply device 15 is configured to supply water to the evaporator 12C while adjusting the flow rate of the water. For example, a flow rate adjuster configured to adjust a water flow rate may be used as the water supply device 15. The flow rate adjuster may be configured as an independent flow rate adjustment valve or as an independent pump. Alternatively, the flow rate adjuster may be configured as a combination of a pump and a flow rate adjustment valve. The water open-close device 76 may be configured as any device, so long as the device is configured to block a water flow. For example, an on-off valve such as a solenoid valve may be used as the water open-close device 76. The evaporator 12C is configured to evaporate the water supplied from the water supply device 15, and to supply resultant steam to the reformer 12B.

The reformer 12B includes a reforming catalyst. The reforming catalyst causes a reforming reaction between a raw material gas and water to generate a hydrogen-containing gas. The raw material gas supply device 16 is connected to the reformer 12B via a raw material gas supply passage 57. The raw material gas supply passage 57 is provided with a raw material gas open-close device 77. The raw material gas supply device 16 may be configured in any form, so long as the raw material gas supply device 16 is configured to supply the raw material gas to the reformer 12B while adjusting the flow rate of the raw material gas. For example, the raw material gas supply device 16 may be configured as an independent flow rate adjustment valve or as an independent booster pump. Alternatively, the raw material gas supply device 16 may be configured as a combination of a booster pump and a flow rate adjustment valve. The raw material gas open-close device 77 may be configured as any device, so long as the device is configured to block the raw material gas from flowing. For example, an on-off valve such as a solenoid valve may be used as the raw material gas open-close device 77. In the reformer 12B, a reforming reaction is caused between the raw material gas supplied from the raw material gas supply device 16 and the steam supplied from the evaporator 12C. As a result, a hydrogen-containing gas is generated. The generated hydrogen-containing gas is supplied to the fuel gas supply passage 51 as a fuel gas.

A gas that contains an organic compound of which constituent elements are at least carbon and hydrogen, for example, a hydrocarbon gas such as ethane or propane, may be used as the raw material gas. Assume a case where a liquid raw material, for example, an alcohol-based raw material such as methanol, is used. In this case, since the internal temperature of the fuel generator 12 is high, when the liquid raw material is supplied into the reformer 12B, the liquid raw material is evaporated and then supplied in the form of a gas. In a case where city gas (natural gas) containing methane as a main component is used as the raw material gas, the raw material gas supply device 16 may include a deodorizing device configured to remove odor components (e.g., mercaptan) from the city gas. In this case, the deodorizing device may include activated carbon or a filter, or may be configured to remove such odor components through adsorption using a zeolite-based adsorbent, or may be configured to use a hydrodesulfurization catalyst.

The fuel generator 12 includes a combustor 12A, to which the downstream end of the fuel gas discharge passage 52 is connected. A combustion air supply device 17 is connected to the combustor 12A via a combustion air supply passage 58. The combustor 12A may include, for example, an igniter and a frame rod which is configured to detect a combustion state of a flue gas. The combustion air supply device 17 may be configured in any form, so long as the combustion air supply device 17 is configured to supply combustion air to the combustor 12A. For example, a fan device such as a blower or a sirocco fan may be used as the combustion air supply device 17. The combustor 12A is supplied with a combustion fuel and the combustion air, which are then combusted and thereby a flue gas is generated. The generated flue gas flows through a flue gas passage (not shown) after heating up, for example, the reformer 12B and the evaporator 12C. Thereafter, the flue gas is discharged to the outside of the fuel cell power generation system 100. It should be noted that, for example, the raw material gas or the hydrogen-containing gas generated by the reformer 12B is used as the combustion fuel.

The fuel gas supply passage 51 connects the fuel generator 12 and the fuel cell 11 (more precisely, the fuel gas channel 1 of the fuel cell 11). The fuel gas supply passage 51 is configured such that the fuel gas generated by the fuel generator 12 flows through the fuel gas supply passage 51. The fuel gas supply passage 51 is provided with the fuel gas supply open-close device 71. The fuel gas supply open-close device 71 may be configured as any device, so long as the device is configured to block a flow of, for example, the fuel gas. For example, an on-off valve such as a solenoid valve may be used as the fuel gas supply open-close device 71. Accordingly, the fuel gas generated by the fuel generator 12 flows through the fuel gas supply passage 51, and is supplied to the fuel gas channel 1 of the fuel cell 11.

The fuel gas discharge passage 52 is configured such that the fuel gas that is unused at the anode 11B of the fuel cell 11 (hereinafter, an off fuel gas) flows through the fuel gas discharge passage 52. The off fuel gas that has flown through the fuel gas discharge passage 52 is supplied to the combustor 12A of the fuel generator 12. The fuel gas discharge passage 52 is provided with the fuel gas discharge open-close device 72. The fuel gas discharge open-close device 72 may be configured as any device, so long as the device is configured to block a flow of, for example, the off fuel gas. For example, an on-off valve such as a solenoid valve may be used as the fuel gas discharge open-close device 72.

The oxidizing gas supply device 13 is connected to the fuel cell 11 (more precisely, the oxidizing gas channel 2 of the fuel cell 11) via the oxidizing gas supply passage 54. The oxidizing gas supply open-close device 74 is provided at a position along the oxidizing gas supply passage 54. The oxidizing gas supply device 13 may be configured in any form, so long as the oxidizing gas supply device 13 is configured to supply the oxidizing gas (air) to the oxidizing gas channel 2 of the fuel cell 11 while adjusting the flow rate of the oxidizing gas. For example, a fan device such as a blower or a sirocco fan may be used as the oxidizing gas supply device 13. The oxidizing gas supply open-close device 74 may be configured as any device, so long as the device is configured to block the oxidizing gas from flowing. For example, an on-off valve such as a solenoid valve may be used as the oxidizing gas supply open-close device 74.

The oxidizing gas discharge passage 55 is connected to the downstream end of the oxidizing gas channel 2 of the fuel cell 11. The oxidizing gas discharge passage 55 is configured such that the oxidizing gas that is unused at the cathode 11C of the fuel cell 11 (hereinafter, an off-oxidizing gas) flows through the oxidizing gas discharge passage 55. The off-oxidizing gas that has flown through the oxidizing gas discharge passage 55 is discharged to the outside of the fuel cell power generation system 100. The oxidizing gas discharge open-close device 75 is provided at a position along the oxidizing gas discharge passage 55. The oxidizing gas discharge open-close device 75 may be configured as any device, so long as the device is configured to block the off-oxidizing gas from flowing. For example, an on-off valve such as a solenoid valve may be used as the oxidizing gas discharge open-close device 75.

The output controller 14 is connected to the fuel cell 11 via wiring 41. The output controller 14 is configured to control the amount of electric power extracted from the fuel cell 11. To be specific, the output controller 14 boosts electric power generated by the fuel cell 11, and converts the boosted power, which is DC power, into AC power. The output controller 14 supplies the DC power to accessory devices of the fuel cell power generation system 100, such as the combustion air supply device 17 and the like using DC power. Also, the output controller 14 supplies the AC power to an external load. As one example, the output controller 14 may include a DC/DC converter and a DC/AC inverter.

The controller 20 may be configured as any device, so long as the device is configured to control each device included in the fuel cell power generation system 100, such as the water supply device 15. For example, the controller 20 may be configured as a microprocessor, CPU, or the like. It should be noted that the controller 20 may be, but need not be, configured as a single controller. For example, the controller 20 may be configured as a group of controllers in which multiple controllers operate in cooperation with each other to control the fuel cell power generation system 100. Moreover, the controller 20 may include not only an arithmetic processing unit exemplified by, for example, a microprocessor or a CPU, but also a storage unit such as a memory and a timer unit.

A remote control (controller) 21 includes a control section (not shown) configured as a microcomputer, a communication section (not shown), a display 21A, and a key operation section 21B. The control section controls the communication section and the like. The remote control 21 receives control signals via the communication section, and the control section processes and transmits the signals to the display 21A. Operation signals inputted from the key operation section 21B of the remote control 21 are transmitted to the controller 20 via the control section and the communication section of the remote control 21. The transmitted signals are received by a communication section of the controller 20. Hereinafter, for the purpose of simplification, description of exchanging of signals between the controller 20 and the remote control 21 omits the description of communications performed by the both communication sections and the description of processing by the control section of the remote control 21.

[Operations of Fuel Cell Power Generation System]

Next, operations performed by the fuel cell power generation system 100 according to Embodiment 1 are described with reference to FIG. 2. It should be noted that the description below describes a stop process performed by the fuel cell power generation system 100, but leaves out the description of power generation operations performed by the fuel cell power generation system 100 according to Embodiment 1 since the power generation operations of the fuel cell power generation system 100 are performed in the same manner as power generation operations of a general fuel cell power generation system.

Figure 2:
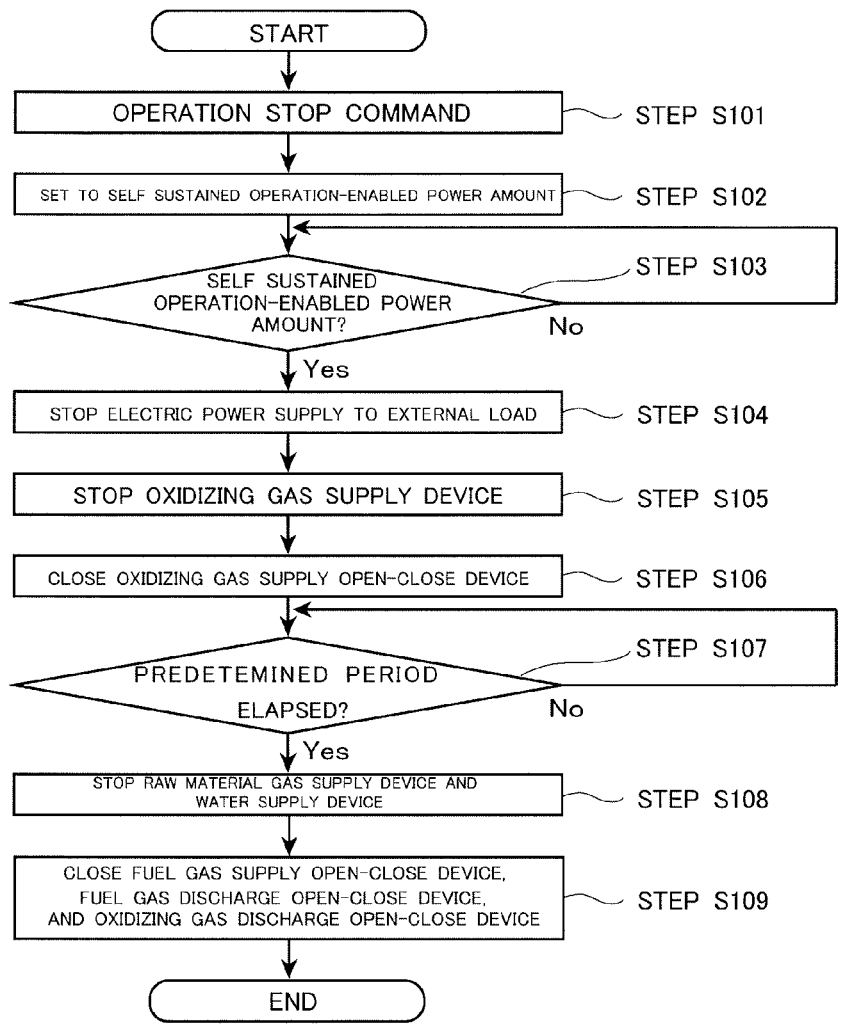
FIG. 2 is a flowchart schematically showing an operation stop process performed by the fuel cell power generation system shown in FIG. 1.

FIG. 2 is a flowchart schematically showing an operation stop process performed by the fuel cell power generation system 100 shown in FIG. 1.

As shown in FIG. 2, for example, if a preset operation stop time of the fuel cell power generation system 100 has arrived when the fuel cell power generation system 100 is operating, or if a user has pressed an operation stop button of the key operation section 21B of the remote control 21, then an operation stop command is inputted to the controller 20 (step S101).

In response, the controller 20 sets the amount of electric power extracted from the fuel cell 11 to a self sustained operation-enabled power amount. Specifically, the controller 20 controls the oxidizing gas supply device 13, the output controller 14, the water supply device 15, and the raw material gas supply device 16, such that the amount of electric power generated by the fuel cell 11 becomes the self sustained operation-enabled power amount (step S102). The self sustained operation-enabled power amount herein refers to an electric power amount, generated by the fuel cell, that is the minimum required for allowing each device included in the fuel cell system to operate in a normal manner when the power extraction from the fuel cell 11 is not performed. The self sustained operation-enabled power amount may be, for example, approximately 30% of electric power generated by the fuel cell 11 when the fuel cell 11 is in a rated operation.

It should be noted that although in Embodiment 1 the amount of electric power extracted from the fuel cell 11 is set to the self sustained operation-enabled power amount in step S102, the present embodiment is not limited thereto. Operational advantages of the present disclosure can be exerted so long as the amount of electric power extracted from the fuel cell 11 is set to an amount that is greater than or equal to the self sustained operation-enabled power amount and smaller than the amount of electric power generated by the fuel cell 11 at a time when the operation stop command to stop the operation of the fuel cell power generation system 100 is inputted to the controller 20.

Next, the controller 20 determines whether or not the amount of electric power extracted by the output controller 14 has become the self sustained operation-enabled power amount (step S103). When the amount of electric power extracted by the output controller 14 has become the self sustained operation-enabled power amount (Yes in step S103), the controller 20 advances the process to step S104.

In step S104, the controller 20 controls the output controller 14 to stop supplying electric power to the external load. Most of hydrogen (usually, approximately 70 to 85%) supplied to the fuel cell 11 when the electric power is supplied to the external load is used for electric power generation. Therefore, a hydrogen concentration is low at the anode 11B within the fuel cell 11 (more precisely, a hydrogen concentration is low in the fuel gas channel 1 and in a part of the fuel gas discharge passage 52, the part extending from the fuel gas channel 1 to the fuel gas discharge open-close device 72). Accordingly, after the electric power supply to the external load is stopped, a time period necessary, before advancing to step S105, for replacing a gas within the anode 11B by an unused hydrogen-rich fuel gas is preferably T seconds represented by (Equation 1) below.

$$3 \times A/FRa \leq T \leq 5 \times A/FRa, \quad \text{(Equation 1)}$$

wherein

A represents a volume [L] of space sealed by the fuel gas supply open-close device and the fuel gas discharge open-close device, and FRa represents a flow rate [L/s] of the fuel gas that is generated by the fuel generator 12 in a case where the amount of electric power extracted from the fuel cell 11 is set to the self sustained operation-enabled power amount.

It should be noted that the output controller 14 may stop not only the electric power supply to the external load but also the supply of DC power generated by the fuel cell 11 to accessory devices included in the fuel cell power generation system 100. The output controller 14 may be configured to continue the supply of DC power to the accessory devices until an average voltage of the cells included in the fuel cell 11 becomes a predetermined value. The accessory devices included in the fuel cell power generation system 100 herein are configured to operate on DC power. Examples of the accessory devices include the combustion air supply device 17, the oxidizing gas supply device 13, and an electric heater for heating up water stored in the hot water tank which is not shown. This configuration makes it possible to lower costs. In a case, for example, where electric power that has been generated by the fuel cell 11 and has passed through the DC/DC converter is used for driving the accessory devices, assuming that an input voltage lower limit value that allows stable operation of the DC/DC converter is 11V and the fuel cell 11 includes a stack of 20 cells, then the predetermined value is 11V/20 cell=0.55V/cell. That is, the predetermined value is obtained through dividing the input voltage lower limit value that allows stable operation of the DC/DC converter by the number of stacked cells of the fuel cell 11.

Next, the controller 20 stops the oxidizing gas supply device 13 (step S105), and closes the oxidizing gas supply open-close device 74 (step S106). It should be noted that since the fuel generator 12 is not stopped, the fuel gas is supplied from the fuel generator 12 through the fuel gas supply passage 51.

Accordingly, the oxidizing gas (oxygen) that remains in the oxidizing gas channel 2 of the fuel cell 11 reacts with the fuel gas (hydrogen) that has leaked from the fuel gas channel 1 into the oxidizing gas channel 2 through the electrolyte membrane 11A, and thereby the oxidizing gas is consumed. When the internal pressure of the oxidizing gas channel 2 has become a negative pressure as a result of the oxidizing gas being consumed, the oxidizing gas that is present in the oxidizing gas discharge passage 55 and of which the oxygen concentration is low (i.e., off-oxidizing gas) is supplied into the oxidizing gas channel 2. Meanwhile, the fuel gas is supplied from the fuel generator 12 to the fuel gas channel 1 of the fuel cell 11 through the fuel gas supply passage 51. Therefore, even if the off-oxidizing gas enters the inside of the fuel cell 11 from the outside, oxygen contained in the off-oxidizing gas is consumed by the fuel gas. In this manner, catalyst degradation of the anode 11B and the cathode 11C can be suppressed. Since the oxygen in the off-oxidizing gas is consumed, the off-oxidizing gas of which the oxygen concentration is sufficiently low is present in the oxidizing gas discharge passage 55 at a position near the oxidizing gas channel 2.

Next, after the oxidizing gas supply open-close device 74 is closed in step S106, when a predetermined period has elapsed (Yes in step S107), the controller 20 stops the raw material gas supply device 16 and the water supply device 15 (step S108). In the fuel cell 11, the predetermined period is changed as necessary in accordance with, for example, the amount of gas leakage through the electrolyte membrane 11A and an A/C ratio. In the A/C ratio, A represents the volume of space (A[L]), the space including the fuel gas channel 1 and being closed (sealed) by the fuel gas supply open-close device 71 and the fuel gas discharge open-close device 72 (hereinafter, anode space volume), and C represents the volume of space (C[L]), the space including the oxidizing gas channel 2 and being closed (sealed) by the oxidizing gas supply open-close device 74 and the oxidizing gas discharge open-close device 75 (hereinafter, cathode space volume). Preferably, the predetermined period is long so as to be able to suppress catalyst degradation of the anode 11B and the cathode 11C by suppressing inflow of air into the anode 11B, which inflow is caused by a rapid pressure drop to a negative pressure due to gas consumption at both the anode and cathode through cross leakage occurring in the fuel cell 11.

Specifically, for example, assume a case where the A/C ratio of the fuel cell 11 is 1.4 (A=0.35 L, C=0.25 L); the amount of gas leakage is 1.17 cc/min (with a pressure applied at 20 kPa) as specified in "General safety code for small polymer electrolyte fuel cell power systems (JIS C 8822:2008)"; and no pressure keeping operation is performed. In this case, the predetermined period may be set to approximately 10 minutes. With such settings, a rapid pressure drop to a negative pressure immediately after the stop of the fuel cell power generation system 100 can be sufficiently alleviated. Accordingly, even after 48 hours elapsed from the stop of the fuel cell power generation system 100, hydrogen is retained in the fuel cell 11 and the potential at both the anode and cathode is maintained at a low level.

It should be noted that the predetermined period may be set as described below in a case where the internal pressure of the fuel cell 11 is kept via the fuel generator 12. Specifically, the predetermined period may be set to such a period that the fuel gas can be supplied in an amount that allows the internal pressure of the fuel cell 11, particularly the internal pressure of the anode 11B, to be kept to a design lower limit pressure or higher during a period until the internal temperature of the fuel generator 12 (more precisely, the reformer 12B) is reduced to such a temperature as not to cause carbon derived from the raw material gas to be deposited on the surface of the reforming catalyst in the reformer 12B. The design lower limit pressure herein refers to a design pressure that allows an air inflow amount to be suppressed to the minimum level as necessary during the aforementioned period in which no pressure keeping operation can be performed. Specifically, if it is assumed, for example, that the A/C ratio of the fuel cell 11 is 1.4 (A=0.35 L, C=0.25 L); the amount of gas leakage is 1.17 cc/min (with a pressure applied at 20 kPa) as specified in "General safety code for small polymer electrolyte fuel cell power systems (JIS C 8822:2008)"; and the period during which no pressure keeping operation can be performed is approximately 40 minutes, then the predetermined period may be set to approximately 1 minute. With such settings, a rapid pressure drop to a negative pressure immediately after the stop of the fuel cell power generation system 100 can be sufficiently alleviated. Accordingly, even after 48 hours elapsed from the stop of the fuel cell power generation system 100, hydrogen is retained in the fuel cell 11 and the potential at both the anode and cathode is maintained at a low level.

Next, the controller 20 closes the fuel gas supply open-close device 71 and the oxidizing gas discharge open-close device 75 (step S108) to seal off the fuel cell 11, and ends executing the program.

As described above, in the fuel cell power generation system 100 according to Embodiment 1, when the operation stop command is outputted, the output controller 14 reduces the amount of fuel gas generated by the fuel generator 12 by reducing the amount of electric power to be generated by the fuel cell 11. Accordingly, energy loss is reduced as compared to conventional fuel cell power generation systems. Moreover, a gas in the fuel cell 11 is replaced by the fuel gas. This prevents a decrease in the performance of the fuel cell 11. Furthermore, if the pressure in the oxidizing gas channel 2 is reduced to a negative pressure, the fuel gas and the off-oxidizing gas of which the oxygen concentration is low are supplied to the oxidizing gas channel 2, and thereby the reduced pressure is compensated for. In this manner, the pressure in the oxidizing gas channel 2 is kept. Accordingly, external air is suppressed from entering the inside of the fuel cell 11. This suppresses a decrease in the performance of the fuel cell 11, and makes it possible to improve the durability of the fuel cell power generation system 100.

It should be noted that in the fuel cell power generation system 100 according to Embodiment 1, the fuel generator 12 is configured such that the hydrogen-containing gas generated by the reformer 12B (i.e., reformed gas) is sent out to the fuel cell 11. However, the present embodiment is not limited thereto. The fuel generator 12 may include a shift converter and/or a carbon monoxide remover for the purpose of reducing carbon monoxide in the hydrogen-containing gas generated by the reformer 12B, the shift converter including a shift conversion catalyst (e.g., a copper-zinc based catalyst) and the carbon monoxide remover including an oxidation catalyst (e.g., a ruthenium-based catalyst).

In the fuel cell power generation system 100 according to Embodiment 1, the fuel cell 11 is configured as a general solid polymer fuel cell. However, the present embodiment is not limited thereto. In the fuel cell 11, the volume of the sealed space (A[L]) which includes the fuel gas channel 1 (hereinafter, an anode space volume) and the volume of the sealed space (C[L]) which includes the oxidizing gas channel 2 (hereinafter, a cathode space volume) are such that the greater the anode space volume, the less the decrease in the internal pressure of the fuel cell 11 immediately after the fuel cell power generation system 100 stops operating, and such that the greater the anode space volume, the less the amount of air inflow into the fuel cell 11 from the outside. This makes it possible to improve the durability of the fuel cell 11 and consequently to improve the durability of the fuel cell power generation system 100. Therefore, it is preferred that the fuel cell 11 is configured such that the A/C ratio is in the range of 1 to 3 in consideration of consumption amounts of oxygen and hydrogen in the fuel cell 11 and the strength of the fuel cell 11.

In Embodiment 1, in step S108, the controller 20 may stop the water supply device 15 and the raw material gas supply device 16 and also close the water open-close device 76 and the raw material gas open-close device 77.

[Variation 1]

Next, a description is given of Variations of the fuel cell power generation system 100 according to Embodiment 1.

A fuel cell power generation system according to Variation 1 of Embodiment 1 includes: a raw material gas supply passage through which the raw material gas supply device supplies the raw material gas to the fuel generator; a raw material gas open-close device configured to open and close the raw material gas supply passage; a water supply passage through which the water supply device supplies the water to the fuel generator; a water open-close device configured to open and close the water supply passage; a fuel gas discharge open-close device configured to open and close the fuel gas discharge passage; and an oxidizing gas supply open-close device configured to open and close the oxidizing gas supply passage. The fuel cell power generation system according to Variation 1 serves as an example where the open-close mechanism includes the raw material gas open-close device, the water open-close device, the fuel gas discharge open-close device, and the oxidizing gas supply open-close device.

[Configuration of Fuel Cell Power Generation System]

Figure 3:
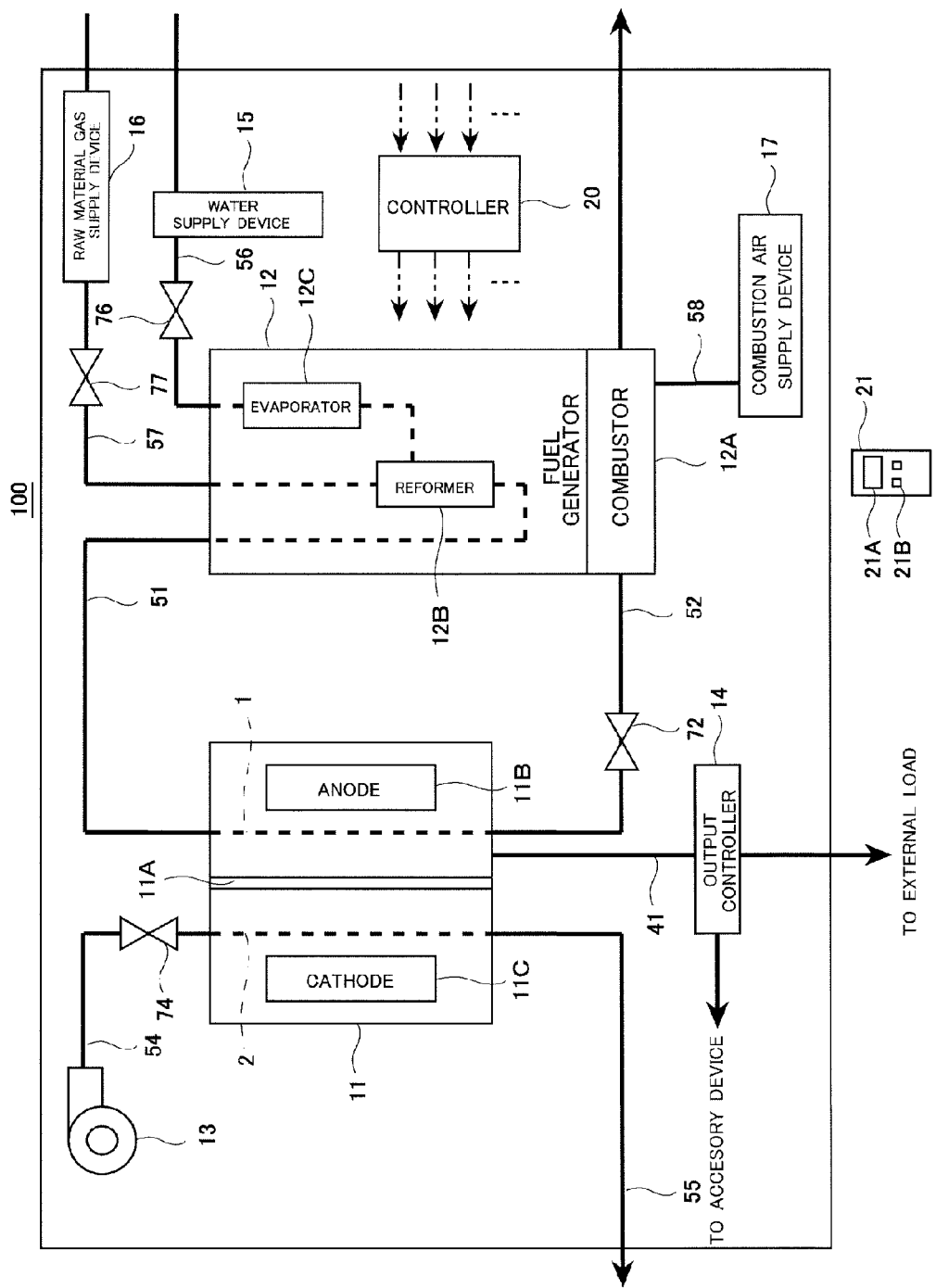
FIG. 3 is a schematic diagram showing a schematic configuration of a fuel cell power generation system according to Variation 1 of Embodiment 1.

FIG. 3 is a schematic diagram showing a schematic configuration of the fuel cell power generation system according to Variation 1 of Embodiment 1.

As shown in FIG. 3, the fundamental configuration of the fuel cell power generation system 100 according to Variation 1 is the same as that of the fuel cell power generation system 100 according to Embodiment 1. However, Variation 1 is different from Embodiment 1 in that the fuel cell power generation system 100 according to Variation 1 does not include the fuel gas supply open-close device 71 and the oxidizing gas discharge open-close device 75. In the fuel cell power generation system 100 according to Variation 1, the water open-close device 76, the raw material gas open-close device 77, the fuel gas discharge open-close device 72, and the oxidizing gas supply open-close device 74 form the open-close mechanism.

[Operation of Fuel Cell Power Generation System]

Figure 4:
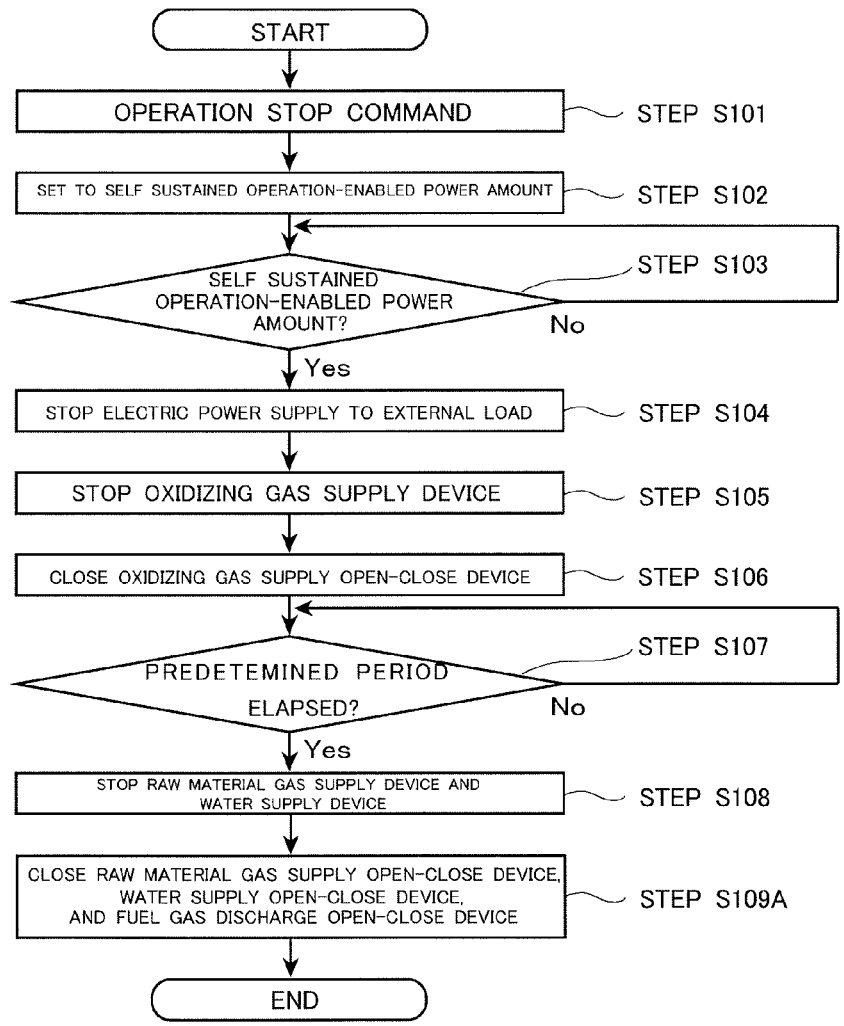
FIG. 4 is a flowchart schematically showing an operation stop process performed by the fuel cell power generation system according to Variation 1 of Embodiment 1.

FIG. 4 is a flowchart schematically showing an operation stop process performed by the fuel cell power generation system according to Variation 1 of Embodiment 1.

As shown in FIG. 4, the operation stop process performed by the fuel cell power generation system 100 according to Variation 1 is fundamentally the same as the operation stop process shown in FIG. 2, which is performed by the fuel cell power generation system 100 according to Embodiment 1. However, Variation 1 is different from Embodiment 1 in that the operation stop process of the fuel cell power generation system 100 according to Variation 1 includes step S109A instead of step S109. Specifically, in step S109A, the controller 20 closes the raw material gas open-close device 77, the water open-close device 76, and the fuel gas discharge open-close device 72.

The fuel gas supply passage 51 is connected to (i.e., communicates with) a passage formed in the fuel generator 12 (the passage including the reformer 12B and the evaporator 12C), the water supply passage 56, and the raw material gas supply passage 57. The passage formed in the fuel generator 12 is configured such that external air normally does not flow into the passage.

Accordingly, the fuel gas supply passage 51 can be closed by closing the water open-close device 76 provided on the water supply passage 56 and closing the raw material gas open-close device 77 provided on the raw material gas supply passage 57.

As described above, when the oxidizing gas supply open-close device 74 is closed in step S106, the oxidizing gas (oxygen) that remains in the oxidizing gas channel 2 of the fuel cell 11 reacts with the fuel gas (hydrogen) that has leaked from the fuel gas channel 1 into the oxidizing gas channel 2 through the electrolyte membrane 11A, and thereby the oxidizing gas is consumed. When the internal pressure of the oxidizing gas channel 2 has become a negative pressure as a result of the oxidizing gas being consumed, the oxidizing gas that is present in the oxidizing gas discharge passage 55 and of which the oxygen concentration is low (i.e., off-oxidizing gas) is supplied into the oxidizing gas channel 2. The oxygen in the off-oxidizing gas supplied into the oxidizing gas channel 2 is consumed by the fuel gas.

As a result, the off-oxidizing gas of which the oxygen concentration is sufficiently low is present in the oxidizing gas discharge passage 55 at a position near the oxidizing gas channel 2. A condenser and a heat exchanger (not shown) for collecting steam and heat of the off-oxidizing gas are connected to the downstream of the oxidizing gas discharge passage 55. Therefore, it is very rare that air (containing a high concentration of oxygen) outside the fuel cell power generation system 100 flows through the oxidizing gas discharge passage 55 to enter the inside of the fuel cell 11 in a diffused manner. For this reason, even though the oxidizing gas discharge passage 55 is not closed by the oxidizing gas discharge open-close device 75, the oxidizing gas channel 2 is sealed with the off-oxidizing gas of which the oxygen concentration is sufficiently low.

Here, in order to suppress catalyst degradation of the anode 11B and the cathode 11C, the off-oxidizing gas (of which the oxygen concentration is sufficiently low) in a volume greater than or equal to the volume of a gas that flows from the oxidizing gas discharge passage 55 into the oxidizing gas channel 2 during the operation stop period, is necessary. The volume of the off-oxidizing gas of which the oxygen concentration is sufficiently low is determined based on a time period over which the fuel gas is supplied to the fuel gas channel 1, that is, the predetermined period in step S107.

Since the oxidizing gas supply open-close device 74 is usually provided on the oxidizing gas supply passage 54 at a position near the entrance of the oxidizing gas channel 2, it can be considered that the cathode space volume is the sum of the volume of the oxidizing gas channel 2 and the volume of a passage, of the oxidizing gas discharge passage 55, that is filled with the off-oxidizing gas of which the oxygen concentration is sufficiently low.

Accordingly, as described above, if it is assumed, for example, that the A/C ratio of the fuel cell 11 is 1.4 (A=0.35 L, C=0.25 L); the amount of gas leakage is 1.17 cc/min (with a pressure applied at 20 kPa) as specified in "General safety code for small polymer electrolyte fuel cell power systems (JIS C 8822:2008)"; and no pressure keeping operation is performed, then the predetermined period may be set to approximately 10 minutes.

In a case where the predetermined period is set in the above manner, even if the internal pressure of the fuel cell 11 becomes a negative pressure after the fuel cell power generation system 100 has stopped, the off-oxidizing gas that is present in the oxidizing gas discharge passage 55 and of which the oxygen concentration is sufficiently low flows into the oxidizing gas channel 2. This suppresses catalyst degradation of the anode 11B and the cathode 11C. Also, even after 48 hours elapsed from the stop of the fuel cell power generation system 100, hydrogen is retained in the fuel cell 11 and the potential at both the anode and cathode is maintained at a low level.

The fuel cell power generation system 100 according to Variation 1 configured as described above provides the same operational advantages as those provided by the fuel cell power generation system 100 according to Embodiment 1.

[Variation 2]

A fuel cell power generation system according to Variation 2 of Embodiment 1 includes: a raw material gas supply passage through which the raw material gas supply device supplies the raw material gas to the fuel generator; a raw material gas open-close device configured to open and close the raw material gas supply passage; a water supply passage through which the water supply device supplies the water to the fuel generator; a water open-close device configured to open and close the water supply passage; a fuel gas discharge open-close device configured to open and close the fuel gas discharge passage; an oxidizing gas supply open-close device configured to open and close the oxidizing gas supply passage; and an oxidizing gas discharge open-close device configured to close the oxidizing gas discharge passage. The fuel cell power generation system according to Variation 2 serves as an example where the open-close mechanism includes the raw material gas open-close device, the water open-close device, the fuel gas discharge open-close device, the oxidizing gas supply open-close device, and the oxidizing gas discharge open-close device.

[Configuration of Fuel Cell Power Generation System]

Figure 5:
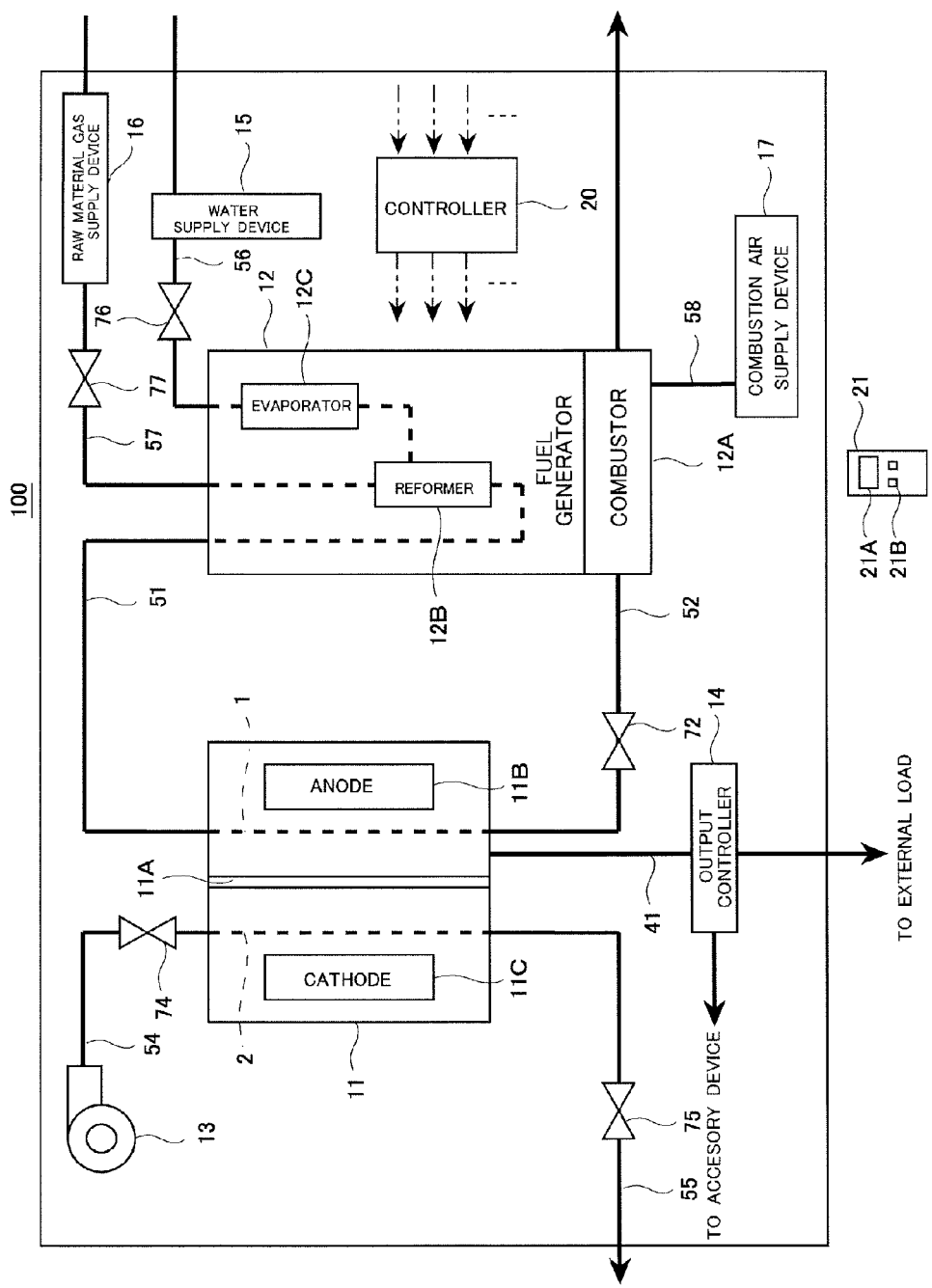
FIG. 5 is a schematic diagram showing a schematic configuration of a fuel cell power generation system according to Variation 2 of Embodiment 1.

FIG. 5 is a schematic diagram showing a schematic configuration of the fuel cell power generation system according to Variation 2 of Embodiment 1.

As shown in FIG. 5, the fundamental configuration of the fuel cell power generation system 100 according to Variation 2 is the same as that of the fuel cell power generation system 100 according to Embodiment 1. However, Variation 2 is different from Embodiment 1 in that the fuel cell power generation system 100 according to Variation 2 does not include the fuel gas supply open-close device 71. In the fuel cell power generation system 100 according to Variation 2, the water open-close device 76, the raw material gas open-close device 77, the fuel gas discharge open-close device 72, the oxidizing gas supply open-close device 74, and the oxidizing gas discharge open-close device 75 form the open-close mechanism.

[Operation of Fuel Cell Power Generation System]

Figure 6:
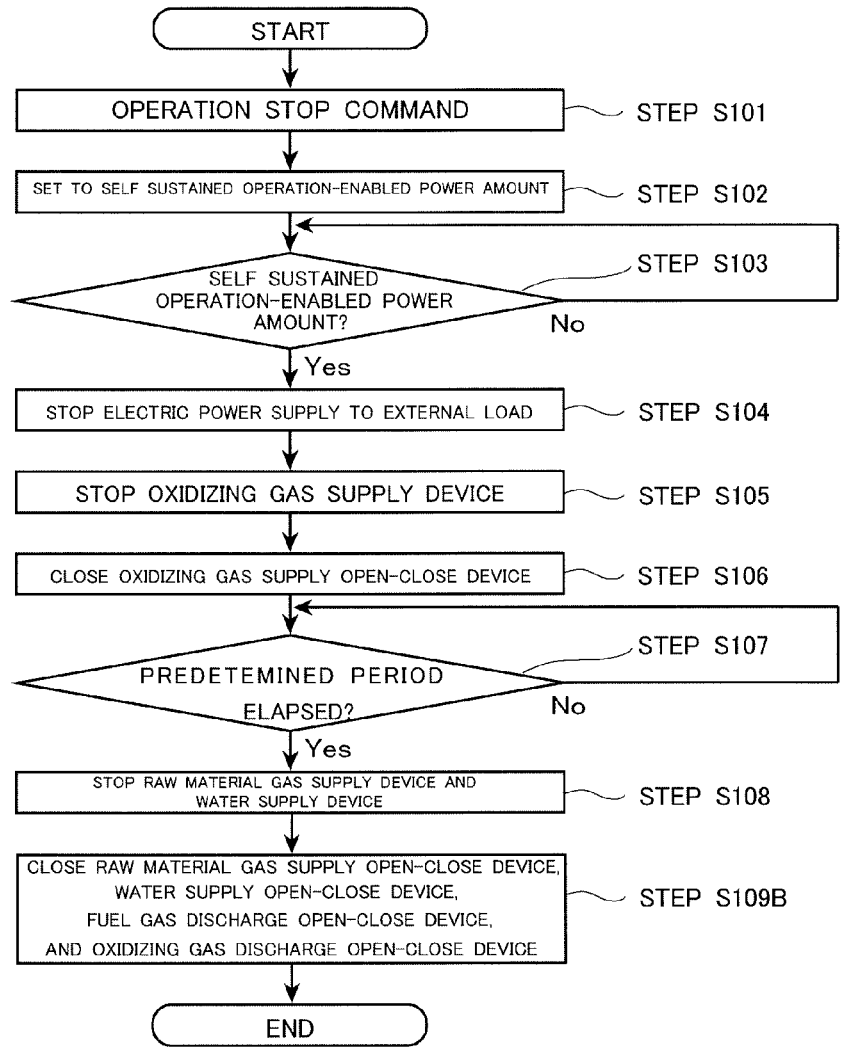
FIG. 6 is a flowchart schematically showing an operation stop process performed by the fuel cell power generation system according to Variation 2 of Embodiment 1.

FIG. 6 is a flowchart schematically showing an operation stop process performed by the fuel cell power generation system according to Variation 2 of Embodiment 1.

As shown in FIG. 6, the operation stop process performed by the fuel cell power generation system 100 according to Variation 1 is fundamentally the same as the operation stop process shown in FIG. 2, which is performed by the fuel cell power generation system 100 according to Embodiment 1. However, Variation 2 is different from Embodiment 1 in that the operation stop process of the fuel cell power generation system 100 according to Variation 2 includes step S109B instead of step S109. Specifically, in step S109B, the controller 20 closes the raw material gas open-close device 77, the water open-close device 76, the fuel gas discharge open-close device 72, and the oxidizing gas discharge open-close device 75.

It should be noted that although the fuel cell power generation system 100 according to Variation 2 does not include the fuel gas supply open-close device 71, the fuel gas supply passage 51 can be closed by closing the water open-close device 76 and the raw material gas open-close device 77, similar to the case of the fuel cell power generation system 100 according to the above-described Variation 1.

The fuel cell power generation system 100 according to Variation 2 configured as described above provides the same operational advantages as those provided by the fuel cell power generation system 100 according to Embodiment 1.

Embodiment 2

A fuel cell power generation system according to Embodiment 2 of the present disclosure includes a fuel gas bypass passage, which connects the fuel gas supply passage and the fuel gas discharge passage and through which the fuel gas flows in a bypassing manner. The fuel cell power generation system according to Embodiment 2 serves as an example where the open-close mechanism is configured to open and close the passage upstream from the fuel gas channel, a passage downstream from the fuel gas channel and upstream from a connection point of the fuel gas bypass passage, the passage upstream from the oxidizing gas channel, and the fuel gas bypass passage, and the controller is configured such that in the stop process, the controller: reduces the amount of the electric power extracted from the fuel cell and then controls the output controller to stop supplying the electric power to the external load; controls the oxidizing gas supply device to stop supplying the oxidizing gas and controls the open-close mechanism to close the passage upstream from the oxidizing gas channel, to open the fuel gas bypass passage, and to close the passage downstream from the fuel gas channel and upstream from the connection point of the fuel gas bypass passage; then stops the raw material gas supply device and the water supply device when the predetermined period has elapsed, during which period the gas in the oxidizing gas channel is replaced by the fuel gas that has cross-leaked to the oxidizing gas channel through the electrolyte membrane; and then controls the open-close mechanism to close at least the passage upstream from the fuel gas channel and the fuel gas bypass passage.

[Configuration of Fuel Cell Power Generation System]

Figure 7:
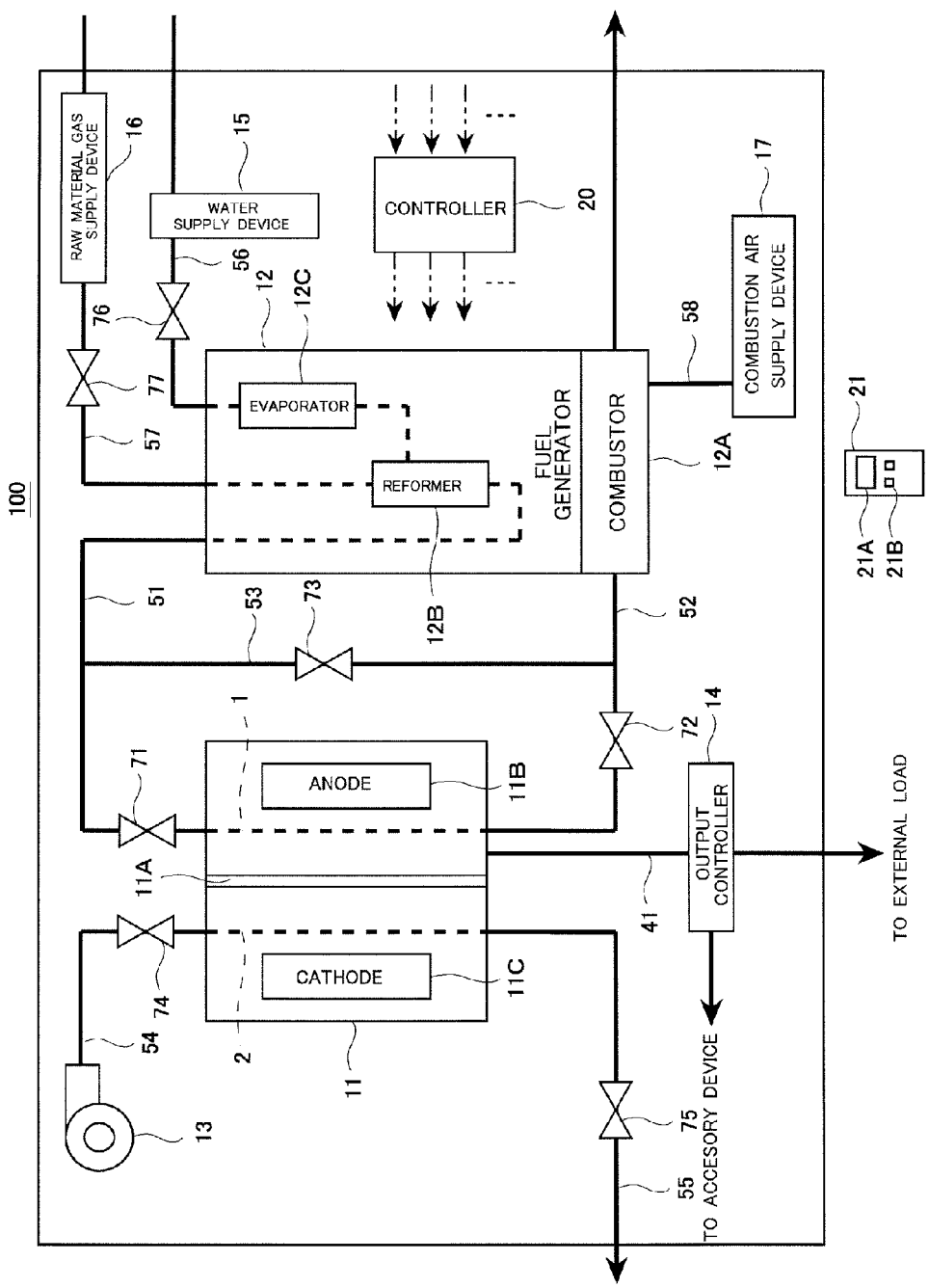
FIG. 7 is a schematic diagram showing a schematic configuration of a fuel cell power generation system according to Embodiment 2 of the present disclosure.

FIG. 7 is a schematic diagram showing a schematic configuration of the fuel cell power generation system according to Embodiment 2 of the present disclosure.

As shown in FIG. 7, the fundamental configuration of the fuel cell power generation system 100 according to Embodiment 2 of the present disclosure is the same as that of the fuel cell power generation system 100 according to Embodiment 1. However, Embodiment 2 is different from Embodiment 1 in that the fuel cell power generation system 100 according to Embodiment 2 includes a fuel gas bypass passage 53 and a fuel gas bypass open-close device 73 provided on the fuel gas bypass passage 53.

Specifically, the upstream end of the fuel gas bypass passage 53 is connected to the fuel gas supply passage 51, and the downstream end of the fuel gas bypass passage 53 is connected to the fuel gas discharge passage 52. The fuel gas bypass passage 53 is provided with the fuel gas bypass open-close device 73. The fuel gas bypass open-close device 73 may be configured as any device, so long as the device is configured to block a flow of, for example, the fuel gas. For example, an on-off valve such as a solenoid valve may be used as the fuel gas bypass open-close device 73. In Embodiment 2, the fuel gas discharge open-close device 72 is provided on the fuel gas discharge passage 52 at a position upstream from a connection point of the fuel gas bypass passage 53.

[Operation of Fuel Cell Power Generation System]

Figure 8:
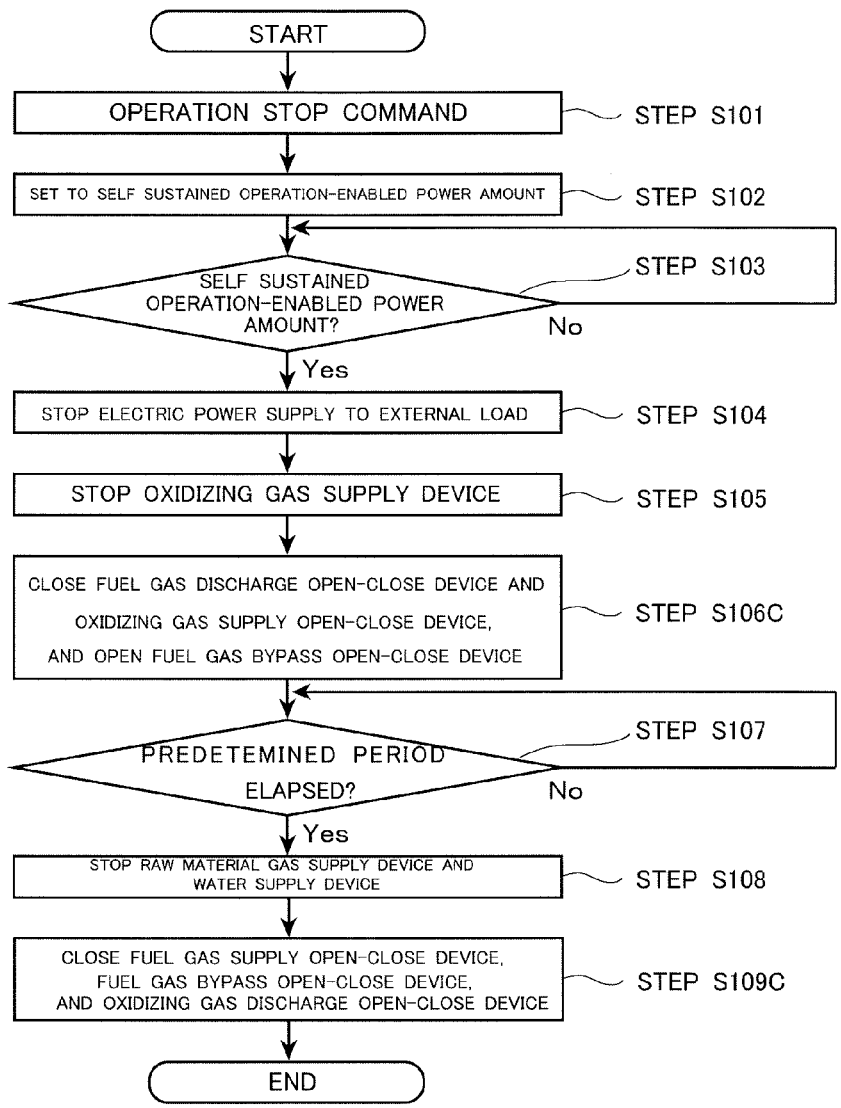
FIG. 8 is a flowchart schematically showing an operation stop process performed by the fuel cell power generation system according to Embodiment 2 of the present disclosure.

FIG. 8 is a flowchart schematically showing an operation stop process performed by the fuel cell power generation system according to Embodiment 2 of the present disclosure.

As shown in FIG. 8, the operation stop process performed by the fuel cell power generation system 100 according to Embodiment 2 is fundamentally the same as the operation stop process shown in FIG. 2, which is performed by the fuel cell power generation system 100 according to Embodiment 1. However, Embodiment 2 is different from Embodiment 1 in that the operation stop process of the fuel cell power generation system 100 according to Embodiment 2 includes step S106C and step S109C instead of step S106 and step S109.

Specifically, in the fuel cell power generation system 100 according to Embodiment 2, in step S106C, the controller 20 closes the fuel gas discharge open-close device 72 and the oxidizing gas discharge open-close device 75, and opens the fuel gas bypass open-close device 73. As a result, the fuel gas generated by the fuel generator 12 flows through the fuel gas supply passage 51, the fuel gas bypass passage 53, and the fuel gas discharge passage 52, and is then supplied to the combustor 12A. In the fuel gas channel 1, when cross leakage of the fuel gas occurs, causing the internal pressure of the fuel gas channel 1 to be reduced to a negative pressure, the fuel gas is supplied from the fuel gas supply passage 51 to the fuel gas channel 1, and thereby the reduced pressure is compensated for. In this manner, the pressure in the fuel gas channel 1 is kept.

Since step S106C is performed in the above manner, the controller 20 closes the fuel gas supply open-close device 71, the fuel gas bypass open-close device 73, and the oxidizing gas discharge open-close device 75 in step S109C.

The fuel cell power generation system 100 according to Embodiment 2 configured as described above provides the same operational advantages as those provided by the fuel cell power generation system 100 according to Embodiment 1.

Although the fuel cell power generation system 100 according to Embodiment 2 includes the fuel gas supply open-close device 71 and the oxidizing gas discharge open-close device 75, the present embodiment is not limited thereto. For example, the fuel cell power generation system 100 according to Embodiment 2 may be configured without including the fuel gas supply open-close device 71 and the oxidizing gas discharge open-close device 75 in a manner similar to Variation 1 of Embodiment 1. In such a case, in step S109C, the controller 20 closes the water open-close device 76, the raw material gas open-close device 77, and the fuel gas bypass open-close device 73.

Further, the fuel cell power generation system 100 according to Embodiment 2 may be configured without including the oxidizing gas discharge open-close device 75 in a manner similar to Variation 2 of Embodiment 1. In such a case, in step S109C, the controller 20 closes the fuel gas supply open-close device 71 and the fuel gas bypass open-close device 73.

[Variation 1]

Figure 9:
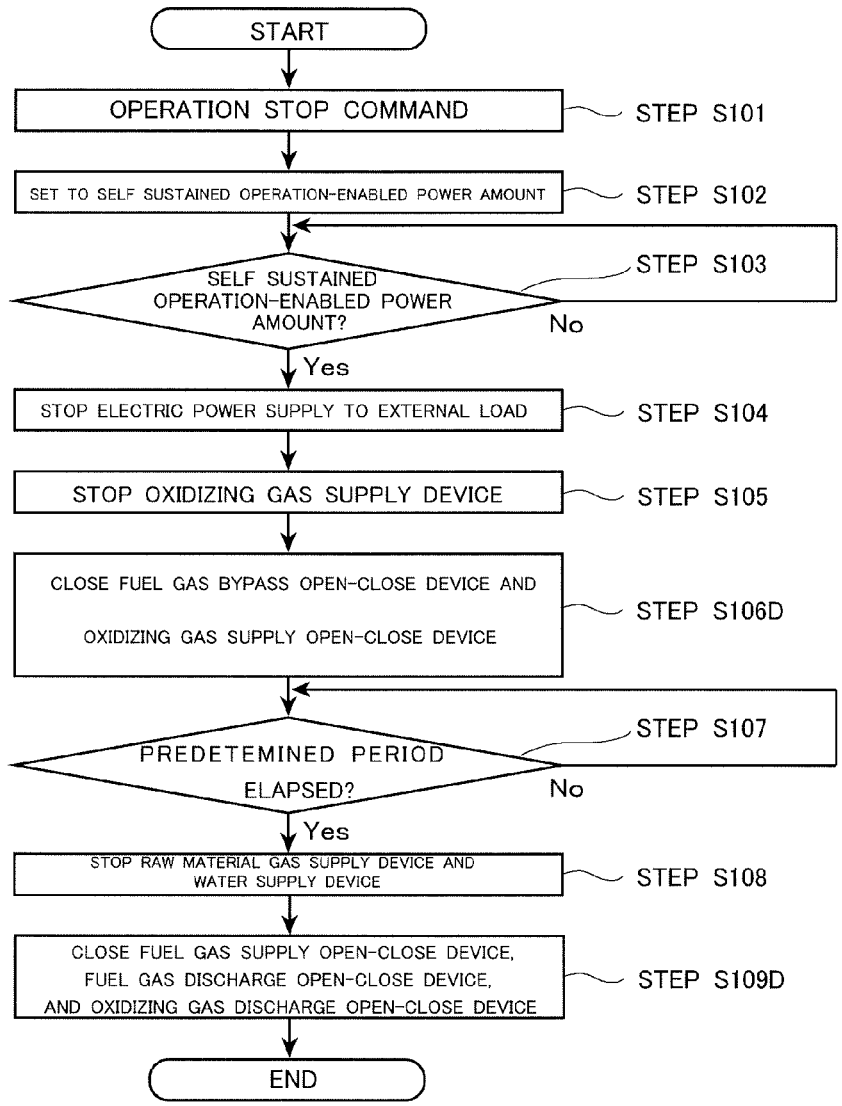
FIG. 9 is a flowchart schematically showing an operation stop process performed by a fuel cell power generation system according to Variation 1 of Embodiment 2.

Next, a description is given of Variation 1 of the fuel cell power generation system 100 according to Embodiment 2 with reference to FIG. 9. Since the configuration of the fuel cell power generation system 100 according to Variation 1 is the same as that of the fuel cell power generation system 100 according to Embodiment 2, the configuration of the fuel cell power generation system 100 according to Variation 1 is not described below.

FIG. 9 is a flowchart schematically showing an operation stop process performed by the fuel cell power generation system according to Variation 1 of Embodiment 2.

As shown in FIG. 9, the operation stop process performed by the fuel cell power generation system 100 according to Variation 1 is fundamentally the same as the operation stop process shown in FIG. 8, which is performed by the fuel cell power generation system 100 according to Embodiment 2. However, Variation 1 is different from Embodiment 2 in that the operation stop process of the fuel cell power generation system 100 according to Variation 1 includes step S106D and step S109D instead of step S106C and step S109C.

Specifically, in step S106D, the controller 20 closes the fuel gas bypass open-close device 73 and the oxidizing gas supply open-close device 74 (more precisely, maintains the closed state of the fuel gas bypass open-close device 73 and closes the oxidizing gas supply open-close device 74), and opens the fuel gas supply open-close device 71, the fuel gas discharge open-close device 72, and the oxidizing gas discharge open-close device 75 (more precisely, maintains the opened state of the fuel gas supply open-close device 71, the fuel gas discharge open-close device 72, and the oxidizing gas discharge open-close device 75. Accordingly, the fuel gas is supplied from the fuel generator 12 to the fuel gas channel 1 of the fuel cell 11 through the fuel gas supply passage 51.

Since step S106D is performed in the above manner, the controller 20 closes the fuel gas supply open-close device 71, the fuel gas discharge open-close device 72, and the oxidizing gas discharge open-close device 75 in step S109D.

The fuel cell power generation system 100 according to Variation 1 configured as described above provides the same operational advantages as those provided by the fuel cell power generation system 100 according to Embodiment 2.

Although the fuel cell power generation system 100 according to Variation 1 includes the fuel gas supply open-close device 71 and the oxidizing gas discharge open-close device 75, the present embodiment is not limited thereto. For example, the fuel cell power generation system 100 according to Variation 1 of Embodiment 2 may be configured without including the fuel gas supply open-close device 71 and the oxidizing gas discharge open-close device 75 in a manner similar to Variation 1 of Embodiment 1. In such a case, in step S109D, the controller 20 closes the water open-close device 76, the raw material gas open-close device 77, and the fuel gas discharge open-close device 72.

Further, the fuel cell power generation system 100 according to Variation 1 of Embodiment 2 may be configured without including the oxidizing gas discharge open-close device 75 in a manner similar to Variation 2 of Embodiment 1. In such a case, in step S109D, the controller 20 closes the fuel gas discharge open-close device 72 and the oxidizing gas discharge open-close device 75.

Embodiment 3

A fuel cell power generation system according to Embodiment 3 of the present disclosure serves as an example where the controller is configured to control the oxidizing gas supply device to stop supplying the oxidizing gas, and is configured to stop the raw material gas supply device and the water supply device.

In the fuel cell power generation system according to Embodiment 3, the fuel generator may include a combustor configured to combust a combustible gas discharged from the fuel cell, and the controller may be configured such that in the stop process, the controller: reduces the amount of the electric power extracted from the fuel cell and then controls the output controller to stop supplying the electric power to the external load; controls the oxidizing gas supply device to stop supplying the oxidizing gas and controls the open-close mechanism to close the passage upstream from the oxidizing gas channel; after the passage upstream from the oxidizing gas channel is closed, when the predetermined period has elapsed, during which period the gas in the oxidizing gas channel is replaced by the fuel gas that has cross-leaked to the oxidizing gas channel through the electrolyte membrane, stops the raw material gas supply device and the water supply device and controls the combustor to combust the combustible gas discharged from the fuel cell; and if flame extinction occurs in the combustor, controls the open-close mechanism to close at least the passage upstream from the fuel gas channel and the passage downstream from the fuel gas channel.

Figure 10:
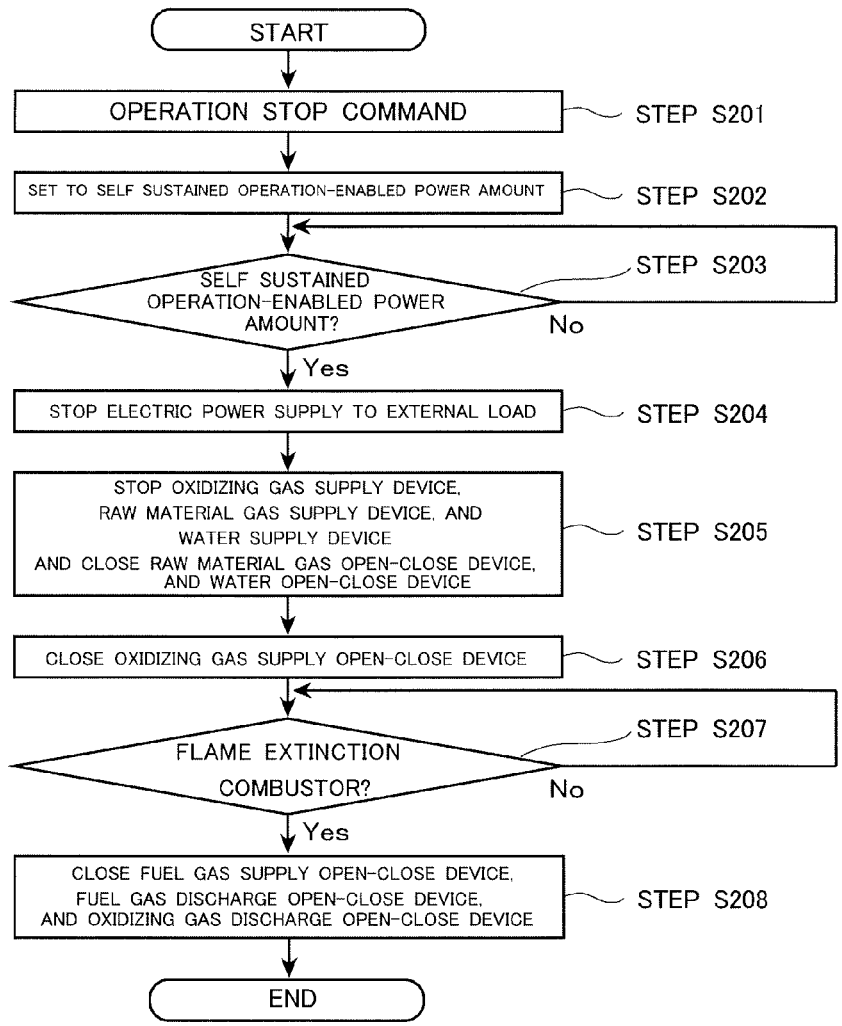
FIG. 10 is a flowchart schematically showing an operation stop process performed by a fuel cell power generation system according to Embodiment 3 of the present disclosure.

FIG. 10 is a flowchart schematically showing an operation stop process performed by the fuel cell power generation system according to Embodiment 3 of the present disclosure.

Since the configuration of the fuel cell power generation system 100 according to Embodiment 3 of the present disclosure is the same as that of the fuel cell power generation system 100 according to Embodiment 1, the configuration of the fuel cell power generation system 100 according to Embodiment 3 is not described below. As shown in FIG. 10, in the operation stop process performed by the fuel cell power generation system 100 according to Embodiment 3, steps S201 to S204 are the same as steps S101 to S104 of the operation stop process shown in FIG. 2, which is performed by the fuel cell power generation system 100 according to Embodiment 1. However, the operation stop process of the fuel cell power generation system 100 according to Embodiment 3 is different from the operation stop process of the fuel cell power generation system 100 according to Embodiment 1 with respect to the process steps S205 and thereafter.

Specifically, in the fuel cell power generation system 100 according to Embodiment 3, in step S205, the controller 20 stops the water supply device 15, the raw material gas supply device 16, and the oxidizing gas supply device 13, and closes the water open-close device 76 and the raw material gas open-close device 77. It should be noted that even when water and raw material supplies to the fuel generator 12 are cut off by stopping the water supply device 15 and the raw material gas supply device 16 and closing the water open-close device 76 and the raw material gas open-close device 77, the internal temperature of the fuel generator 12 is kept to a high temperature. Accordingly, water remaining in the evaporator 12C evaporates and thereby steam is generated. As a result, the fuel gas is kept generated in the fuel generator 12 for a while. Thus, even if the fuel generator 12 and the oxidizing gas supply device 13 are stopped at the same time, the oxidizing gas that is present in the oxidizing gas channel 2 can be sufficiently consumed and the pressure in the fuel gas channel 1 can be kept at a sufficient level.

Next, the controller 20 closes the oxidizing gas supply open-close device 74 (step S206) to perform, for example, consumption of the oxidizing gas in the oxidizing gas channel 2.

It should be noted that if steam generation by the evaporator 12C is stopped, then the raw material gas and the fuel gas are no longer pushed into the fuel gas supply passage 51, causing flame extinction in the combustor 12A. Therefore, unlike Embodiment 1, the controller 20 in Embodiment 3 determines whether or nor flame extinction has occurred in the combustor 12A (step S207). It should be noted that whether or not flame extinction has occurred in the combustor 12A may be determined by, for example, detecting flame extinction in the combustor 12A by using a frame rod provided in the combustor 12A. Alternatively, a time at which flame extinction occurs in the combustor 12A may be calculated beforehand through an experiment or the like. In this case, whether or not flame extinction has occurred in the combustor 12A may be determined based on whether or not the time has passed.

If it is determined that flame extinction has occurred in the combustor 12A (Yes in step S207), then the controller 20 closes the fuel gas supply open-close device 71, the fuel gas discharge open-close device 72, and the oxidizing gas discharge open-close device 75 (step S208), and ends the program.

The fuel cell power generation system 100 according to Embodiment 3 configured as described above provides the same operational advantages as those of the fuel cell power generation system 100 according to Embodiment 1.

The process may advance to step S205 immediately after step S204 is performed. However, from the standpoint of replacing a gas in the anode 11B by an unused hydrogen-rich fuel gas, it is preferred to purge the inside of the fuel gas channel 1 of the fuel cell 11 by using a hydrogen-rich fuel gas. Here, whether or not the inside of the fuel gas channel 1 has been purged is determined by using, for example, a method in which a time period from when the electric power supply to the external load is stopped to when the oxidizing gas supply device 13 is stopped is set in advance.

In Embodiment 3, if the controller 20 determines that flame extinction has occurred in the combustor 12A, then the process advances to step S208. However, the present embodiment is not limited thereto. Similar to Embodiment 1, the process may advance to step S208 after the predetermined period has elapsed.

Although the fuel cell power generation system 100 according to Embodiment 3 includes the fuel gas supply open-close device 71 and the oxidizing gas discharge open-close device 75. The present embodiment is not limited thereto. For example, the fuel cell power generation system 100 according to Embodiment 3 may be configured without including the fuel gas supply open-close device 71 and the oxidizing gas discharge open-close device 75 in a manner similar to Variation 1 of Embodiment 1. In such a case, in step S208, the controller 20 closes the water open-close device 76, the raw material gas open-close device 77, and the fuel gas discharge open-close device 72.

Further, the fuel cell power generation system 100 according to Embodiment 3 may be configured without including the oxidizing gas discharge open-close device 75 in a manner similar to Variation 2 of Embodiment 1. In such a case, in step S208, the controller 20 closes the fuel gas supply open-close device 71 and the fuel gas discharge open-close device 72.

Embodiment 4

A fuel cell power generation system according to Embodiment 4 of the present disclosure serves as an example where the controller is configured to control the oxidizing gas supply device to stop supplying the oxidizing gas, and is configured to stop the raw material gas supply device and the water supply device.

In the fuel cell power generation system according to Embodiment 4, the fuel generator may include a combustor configured to combust a combustible gas discharged from the fuel cell, and the controller may be configured such that in the stop process, the controller: reduces the amount of the electric power extracted from the fuel cell and then controls the output controller to stop supplying the electric power to the external load; controls the oxidizing gas supply device to stop supplying the oxidizing gas and controls the open-close mechanism to close the passage upstream from the oxidizing gas channel; after the passage upstream from the oxidizing gas channel is closed, when the predetermined period has elapsed, during which period the gas in the oxidizing gas channel is replaced by the fuel gas that has cross-leaked to the oxidizing gas channel through the electrolyte membrane, stops the raw material gas supply device and the water supply device and controls the combustor to combust the combustible gas discharged from the fuel cell; and if flame extinction occurs in the combustor, controls the open-close mechanism to close at least the passage upstream from the fuel gas channel and the passage downstream from the fuel gas channel.

Figure 11:
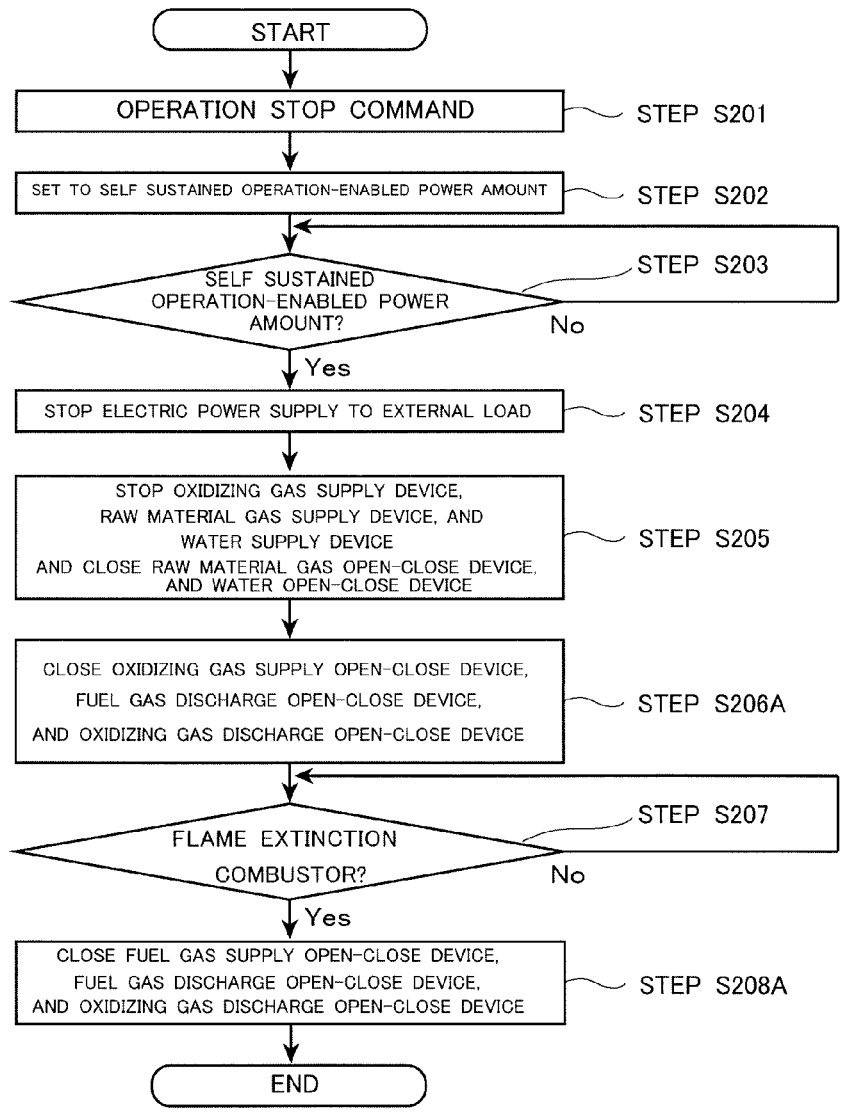
FIG. 11 is a flowchart schematically showing an operation stop process performed by a fuel cell power generation system according to Embodiment 4 of the present disclosure.

FIG. 11 is a flowchart schematically showing an operation stop process performed by the fuel cell power generation system according to Embodiment 4 of the present disclosure.

Since the configuration of the fuel cell power generation system 100 according to Embodiment 4 of the present disclosure is the same as that of the fuel cell power generation system 100 according to Embodiment 2, the configuration of the fuel cell power generation system 100 according to Embodiment 4 is not described below.

As shown in FIG. 11, the operation stop process performed by the fuel cell power generation system 100 according to Embodiment 4 is fundamentally the same as the operation stop process shown in FIG. 10, which is performed by the fuel cell power generation system 100 according to Embodiment 3. However, Embodiment 4 is different from Embodiment 3 in that the operation stop process of the fuel cell power generation system 100 according to Embodiment 4 includes step S206A and step S5208A instead of step S206 and step S208.

Specifically, in the fuel cell power generation system 100 according to Embodiment 4, in step S206A, the oxidizing gas supply open-close device 74 and the fuel gas discharge open-close device 72 are closed and the fuel gas bypass open-close device 73 is opened to perform, for example, consumption of the oxidizing gas in the oxidizing gas channel 2.

It should be noted that since the fuel gas discharge passage 52 is closed by the fuel gas discharge open-close device 72, a situation may occur where a pressure keeping operation of keeping the internal pressure of the fuel gas channel 1 becomes necessary due to, for example, the consumption of the oxidizing gas in the oxidizing gas channel 2. However, as described above, even when the water and raw material supplies to the fuel generator 12 are cut off in step S205, the fuel gas generation is continued for a while. Accordingly, the fuel gas for keeping the pressure in the fuel gas channel 1, which is necessary due to, for example, the consumption of the oxidizing gas in the oxidizing gas channel 2, can be supplied from the fuel gas supply passage 51 to the fuel gas channel 1 even if the fuel generator 12 and the oxidizing gas supply device 13 are stopped at the same time.

Similar to Embodiment 3, if it is determined that flame extinction has occurred in the combustor 12A (Yes in step S207), the controller 20 closes the fuel gas supply open-close device 71, the fuel gas bypass open-close device 73, and the oxidizing gas discharge open-close device 75 (step S208A), and ends the program.

The fuel cell power generation system 100 according to Embodiment 4 configured as described above provides the same operational advantages as those provided by the fuel cell power generation system 100 according to Embodiment 3.

In Embodiment 4, the oxidizing gas supply open-close device 74 and the fuel gas discharge open-close device 72 are closed and the fuel gas bypass open-close device 73 is opened in step S206A, and the fuel gas supply open-close device 71, the fuel gas bypass open-close device 73, and the oxidizing gas discharge open-close device 75 are closed in step S208A. However, the present embodiment is not limited thereto.

For example, in step S206A, the controller 20 may close the fuel gas bypass open-close device 73 and the oxidizing gas supply open-close device 74 (more precisely, maintain the closed state of the fuel gas bypass open-close device 73, and close the oxidizing gas supply open-close device 74), and may open the fuel gas supply open-close device 71, the fuel gas discharge open-close device 72, and the oxidizing gas discharge open-close device 75 (more precisely, maintain the opened state of the fuel gas supply open-close device 71, the fuel gas discharge open-close device 72, and the oxidizing gas discharge open-close device 75). In step S208A, the controller 20 may close the fuel gas supply open-close device 71, the fuel gas discharge open-close device 72, and the oxidizing gas discharge open-close device 75.

In Embodiment 4, the process may advance to step S205 immediately after step S204 is performed. However, from the standpoint of replacing a gas in the anode 11B by an unused hydrogen-rich fuel gas, it is preferred to purge the inside of the fuel gas channel 1 of the fuel cell 11 by using a hydrogen-rich fuel gas. Here, whether or not the inside of the fuel gas channel 1 has been purged is determined by using, for example, a method in which a time period from when the electric power supply to the external load is stopped to when the oxidizing gas supply device 13 is stopped is set in advance.

Further, in Embodiment 4, if the controller 20 determines that flame extinction has occurred in the combustor 12A, then the process advances to step S208. However, the present embodiment is not limited thereto. Similar to Embodiment 1, the process may advance to step S208A after the predetermined period has elapsed.

Although the fuel cell power generation system 100 according to Embodiment 4 includes the fuel gas supply open-close device 71 and the oxidizing gas discharge open-close device 75, the present embodiment is not limited thereto. For example, the fuel cell power generation system 100 according to Embodiment 4 may be configured without including the fuel gas supply open-close device 71 and the oxidizing gas discharge open-close device 75 in a manner similar to Variation 1 of Embodiment 1. In such a case, in step S208A, the controller 20 closes the water open-close device 76, the raw material gas open-close device 77, and the fuel gas discharge open-close device 72.

Further, the fuel cell power generation system 100 according to Embodiment 4 may be configured without including the oxidizing gas discharge open-close device 75 in a manner similar to Variation 2 of Embodiment 1. In such a case, in step S208A, the controller 20 closes the fuel gas supply open-close device 71 and the fuel gas discharge open-close device 72.

Embodiment 5

A fuel cell power generation system according to Embodiment 5 of the present disclosure serves as an example where after the open-close mechanism has closed at least the passage upstream from the fuel gas channel and the passage downstream from the fuel gas channel, when an internal temperature of the fuel generator is reduced to a temperature that does not cause carbon deposition from the raw material gas, the controller controls the open-close mechanism to open the passage upstream from the fuel gas channel and controls the raw material gas supply device to supply the raw material gas through the fuel generator to the fuel gas channel of the fuel cell.

In the fuel cell power generation system according to Embodiment 5, the controller may be configured to control the open-close mechanism to open the passage upstream from the fuel gas channel and to control the raw material gas supply device to supply the raw material gas through the fuel generator to the fuel gas channel, in response to a pressure decrease in the fuel cell that is caused by a temperature decrease in the fuel cell.

In the fuel cell power generation system according to Embodiment 5, in a case where the open-close mechanism is configured to open and close a passage downstream from the oxidizing gas channel, the controller may be configured to control the open-close mechanism to open the passage upstream from the fuel gas channel and the passage downstream from the oxidizing gas channel and to control the raw material gas supply device to supply the raw material gas through the fuel generator to the fuel gas channel, in response to a pressure decrease in the fuel cell that is caused by a temperature decrease in the fuel cell.

Figure 12:
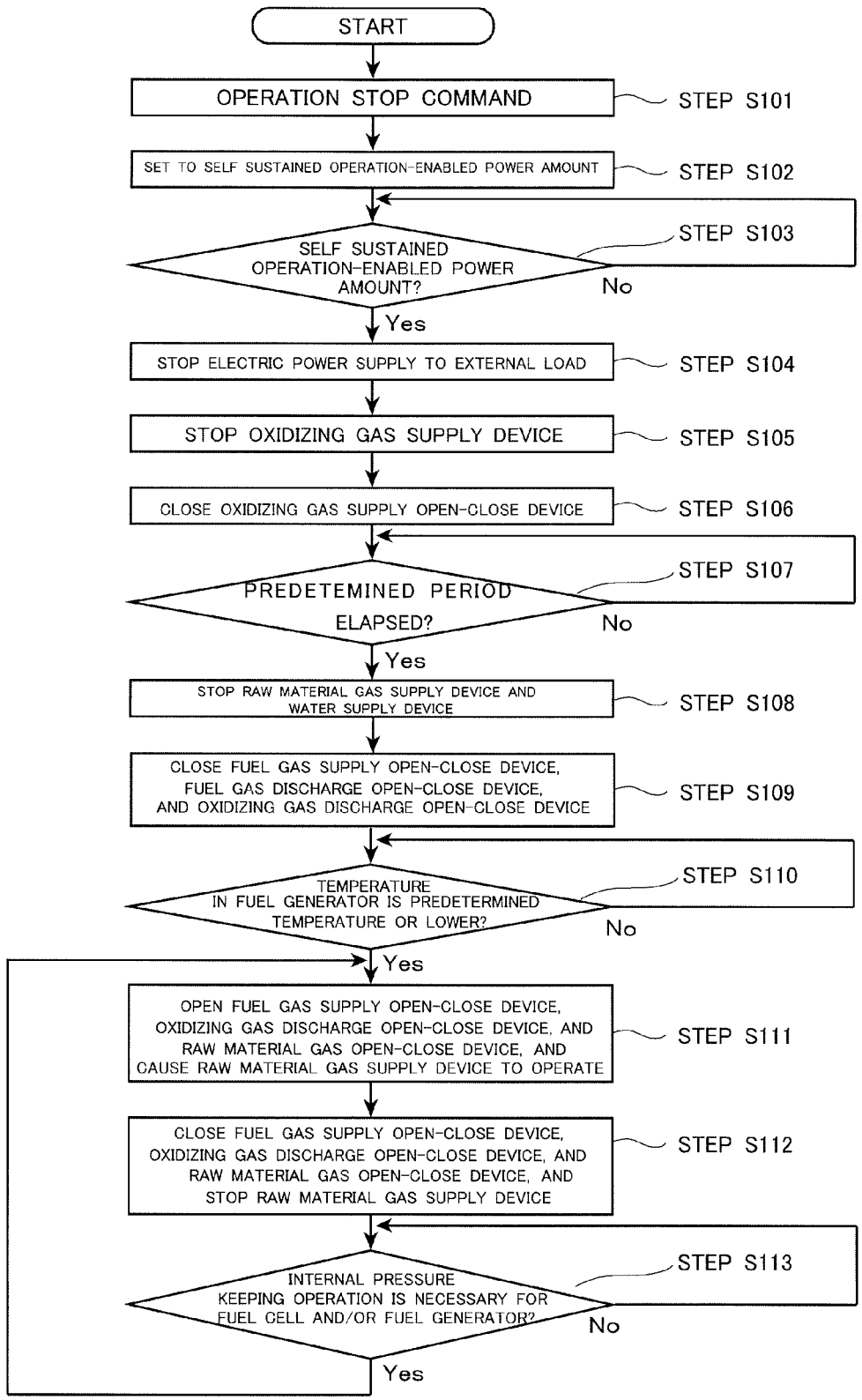
FIG. 12 is a flowchart schematically showing an operation stop process performed by a fuel cell power generation system according to Embodiment 5 of the present disclosure.

FIG. 12 is a flowchart schematically showing an operation stop process performed by the fuel cell power generation system according to Embodiment 5 of the present disclosure.

Since the configuration of the fuel cell power generation system 100 according to Embodiment 5 of the present disclosure is the same as that of the fuel cell power generation system 100 according to Embodiment 1, the configuration of the fuel cell power generation system 100 according to Embodiment 5 is not described below. As shown in FIG. 12, the operation stop process performed by the fuel cell power generation system 100 according to Embodiment 5 is fundamentally the same as the operation stop process shown in FIG. 2, which is performed by the fuel cell power generation system 100 according to Embodiment 1. However, Embodiment 5 is different from Embodiment 1 in that the operation stop process of the fuel cell power generation system 100 according to Embodiment 5 includes a pressure keeping process of keeping the pressure in the fuel generator 12 and the pressure in the fuel cell 11.

Specifically, the controller 20 performs the process steps up to step S109 in the same manner as the operation stop process of the fuel cell power generation system 100 according to Embodiment 1. After performing step S109, when the internal temperature of the fuel generator 12 (more precisely, the reformer 12B) is reduced to such a temperature as not to cause carbon derived from the raw material gas to be deposited on the surface of the reforming catalyst in the reformer 12B (Yes in step S110), the fuel gas supply open-close device 71, the oxidizing gas discharge open-close device 75, and the raw material gas open-close device 77 are opened, and the raw material gas supply device 16 is caused to operate (step S111). Accordingly, the raw material gas flows from the raw material gas supply device 16 through the raw material gas supply passage 57, and is supplied into the fuel generator 12. In this manner, the pressure in the fuel generator 12 is kept. The raw material gas that has been supplied into the fuel generator 12 further flows through the fuel gas supply passage 51. Then, the raw material gas is supplied into the fuel gas channel 1 of the fuel cell 11, and thereby the pressure in the fuel gas channel 1 is kept. Meanwhile, the off-oxidizing gas that is present in the oxidizing gas discharge passage 55 is supplied to the oxidizing gas channel 2 of the fuel cell 11, and thereby the pressure in the oxidizing gas channel 2 is kept.

It should be noted that, preferably, the aforementioned temperature that does not cause carbon derived from the raw material gas to be deposited on the surface of the reforming catalyst in the reformer 12B is, for example, 450° C. or lower in a case where a Ru-based catalyst is used as the reforming catalyst in the reformer 12B, and 300° C. or lower in a case where a Ni-based catalyst is used as the reforming catalyst in the reformer 12B. Whether or not the internal temperature of the reformer 12B has been reduced to such a temperature or lower may be determined by detecting the internal temperature of the reformer 12B by using a temperature detector. Alternatively, a time at which the internal temperature of the reformer 12B is reduced to such a temperature or lower after step S109 may be calculated beforehand through an experiment or the like. In this case, whether or not the internal temperature of the reformer 12B has been reduced to such a temperature or lower may be determined based on whether or not the time has passed.

Then, the controller 20 closes the fuel gas supply open-close device 71, the oxidizing gas discharge open-close device 75, and the raw material gas open-close device 77, and stops the raw material gas supply device 16 (step S112). It should be noted that times at which to open the fuel gas supply open-close device 71, the oxidizing gas discharge open-close device 75, and the raw material gas open-close device 77, and to cause the raw material gas supply device 16 to operate, are suitably determined based on the size of the fuel generator 12 as well as the anode space volume and the cathode space volume.

Next, if the internal pressure of the fuel cell 11 and/or the fuel generator 12 becomes a negative pressure due to, for example, a change in external temperature, a change in external pressure, a change in the fuel cell's internal pressure, or a pre-programmed cycle, and thereby a pressure keeping operation becomes necessary (Yes in step S114), then the controller 20 performs steps S111 and S112 to keep the pressure in the fuel cell 11 and/or in the fuel generator 12. Thereafter, the controller 20 repeats the steps S111 to S113 until a next operation start command is inputted from the remote control 21.

The fuel cell power generation system 100 according to Embodiment 5 configured as described above provides the same operational advantages as those provided by the fuel cell power generation system 100 according to Embodiment 1. In addition, the fuel cell power generation system 100 according to Embodiment 5 is capable of keeping the internal pressure of the fuel generator 12 while suppressing degradation of the reforming catalyst in the reformer 12B.

The fuel cell power generation system 100 according to Embodiment 5 has been described exemplifying a case where a pressure keeping operation for the fuel gas channel 1 and a pressure keeping operation for the oxidizing gas channel 2 are performed at the same time. However, the same advantageous effects can be obtained even if the pressure keeping operations are not performed at the same time. In the pressure keeping operation for the oxidizing gas channel 2, the gas of which the pressure is to be kept is air, and a pressure reduction rate in the oxidizing gas channel 2 significantly decreases after the pressure keeping operation has been performed several times. Therefore, if the pressure keeping operation is performed more than necessary, it results in energy loss, and also, it may cause durability decrease due to unnecessary oxygen supply. For this reason, preferably, after 3 to 5 hours have elapsed since the stop of the operation of the fuel cell power generation system 100, the pressure keeping operation may be stopped only for the oxidizing gas channel 2, that is, an operation of opening the oxidizing gas discharge open-close device 75 may be avoided.

Although the fuel cell power generation system 100 according to Embodiment 5 includes the fuel gas supply open-close device 71 and the oxidizing gas discharge open-close device 75, the present embodiment is not limited thereto. For example, the fuel cell power generation system 100 according to Embodiment 5 may be configured without including the fuel gas supply open-close device 71 and the oxidizing gas discharge open-close device 75 in a manner similar to Variation 1 of Embodiment 1. In such a case, the controller 20 performs step S109A instead of step S109 (see FIG. 4), and in step S111, the controller 20 opens the raw material gas open-close device 77 and causes the raw material gas supply device 16 to operate. In addition, in step S112, the controller 20 closes the raw material gas open-close device 77, and stops the raw material gas supply device 16.

Further, the fuel cell power generation system 100 according to Embodiment 4 may be configured without including the oxidizing gas discharge open-close device 75 in a manner similar to Variation 2 of Embodiment 1. In such a case, the controller 20 performs step S109B instead of step S109 (see FIG. 6), and in step S111, the controller 20 opens the raw material gas open-close device 77 and the oxidizing gas discharge open-close device 75 and causes the raw material gas supply device 16 to operate. In addition, in step S112, the controller 20 closes the raw material gas open-close device 77 and the oxidizing gas discharge open-close device 75, and stops the raw material gas supply device 16.

From the foregoing description, numerous modifications and other embodiments of the present disclosure are obvious to one skilled in the art. Therefore, the foregoing description should be interpreted only as an example and is provided for the purpose of teaching the best mode for carrying out the present invention to one skilled in the art. The structures and/or functional details may be substantially modified without departing from the spirit of the present disclosure. In addition, various inventions can be made by suitable combinations of a plurality of components disclosed in the above embodiments.

INDUSTRIAL APPLICABILITY

The fuel cell power generation system and the operation stop method of the fuel cell power generation system according to the present disclosure realize lowered costs, reduced energy loss, and improved durability. Therefore, the present invention is useful in the field of fuel cells.

REFERENCE SIGNS LIST 1 fuel gas channel
2 oxidizing gas channel
11 fuel cell
11A electrolyte membrane
11B anode
11C cathode
12 fuel generator
12A combustor
12B reformer
12C evaporator
13 oxidizing gas supply device
14 output controller
15 water supply device
16 raw material gas supply device
17 combustion air supply device
20 controller
21 remote control
21A display
21B operation section
41 wiring
51 fuel gas supply passage
52 fuel gas discharge passage
53 fuel gas bypass passage
54 oxidizing gas supply passage
55 oxidizing gas discharge passage
56 water supply passage
57 raw material gas supply passage
58 combustion air supply passage
71 fuel gas supply open-close device
72 fuel gas discharge open-close device
73 fuel gas bypass open-close device
74 oxidizing gas supply open-close device
75 oxidizing gas discharge open-close device
76 water open-close device
77 raw material gas open-close device
100 fuel cell power generation system

What is claimed is:

1. An operation stop method of a fuel cell power generation system including a fuel cell, the fuel cell including an electrolyte membrane, an anode, a cathode, a fuel gas channel through which a fuel gas is supplied to the anode, and an oxidizing gas channel through which an oxidizing gas is supplied to the cathode, the fuel cell being configured to generate electric power by causing a reaction between the fuel gas supplied to the anode and the oxidizing gas supplied to the cathode, the operation stop method comprising:

a step (A) in which an output controller reduces an amount of electric power extracted from the fuel cell and then stops supplying the electric power to an external load;

a step (C) in which either
an oxidizing gas supply device stops supplying the oxidizing gas, an open-close mechanism closes a passage upstream from the oxidizing gas channel, and after the passage upstream from the oxidizing gas channel is closed, a raw material gas supply device and a water supply device stop when a predetermined period has elapsed, during which period the oxidizing gas in the oxidizing gas channel is consumed by the fuel gas that has cross-leaked to the oxidizing gas channel through the electrolyte membrane, or the oxidizing gas supply device stops supplying the oxidizing gas, the raw material gas supply device and the water supply device stop, the open-close mechanism closes the passage upstream from the oxidizing gas channel, and the predetermined period elapses, during which period the oxidizing gas in the oxidizing gas channel is consumed by the fuel gas that has cross-leaked to the oxidizing gas channel through the electrolyte membrane; and a step (D) in which the open-close mechanism closes a passage upstream from the fuel gas channel and a passage downstream from the fuel gas channel after the step (C), wherein after supply of the electric power to the external load is stopped, a period until the supply of the oxidizing gas is stopped is a period T represented by the following Equation (1):

$$3 \times A/FRa \leq T \leq 5 \times A/Fra \qquad (1),$$

where A represents a volume [L] of space sealed by a fuel gas supply open-close device and a fuel gas discharge open-close device, and FRa represents a flow rate [L/s] of the fuel gas that is generated by a fuel generator in a case where the amount of the electric power extracted from the fuel cell is set to a self sustained operation-enabled power amount.

2. The operation stop method of the fuel cell power generation system according to claim 1, wherein
in the step (A), the output controller reduces the amount of the electric power extracted from the fuel cell to be less than an amount of electric power previously generated by the fuel cell and to be in a range no less than a self sustained operation-enabled power amount.

3. The operation stop method of the fuel cell power generation system according to claim 1, wherein:
a fuel generator includes a combustor configured to combust a combustible gas discharged from the fuel cell, and
in the step (D), the combustor combusts the combustible gas discharged from the fuel cell, and if flame extinction occurs in the combustor, the open-close mechanism closes the passage upstream from the fuel gas channel and the passage downstream from the fuel gas channel.

4. The operation stop method of the fuel cell power generation system according to claim 1, the operation stop method further comprising:
a step (E) of opening the passage upstream from the fuel gas channel by the open-close mechanism, and supplying a raw material gas by the raw material gas supply device through a fuel generator to the fuel gas channel of the fuel cell, the step (E) being performed after the step (D) when an internal temperature of the fuel generator is reduced to a temperature that does not cause carbon deposition from the raw material gas.

5. The operation stop method of the fuel cell power generation system according to claim 4, wherein
in the step (E), the open-close mechanism opens the passage upstream from the fuel gas channel and the raw material gas supply device supplies the raw material gas through the fuel generator to the fuel gas channel, in response to a pressure decrease in the fuel cell that is caused by a temperature decrease in the fuel cell.

6. The operation stop method of the fuel cell power generation system according to claim 4, wherein:
in the step (D), the open-close mechanism closes the passage upstream from the fuel gas channel, the passage downstream from the fuel gas channel, and a passage downstream from the oxidizing gas channel, and
in the step (E), the open-close mechanism opens the passage upstream from the fuel gas channel and the passage downstream from the oxidizing gas channel, and the raw material gas supply device supplies the raw material gas through the fuel generator to the fuel gas channel, in response to a pressure decrease in the fuel cell that is caused by a temperature decrease in the fuel cell.

* * * * *